(12) United States Patent  
Fujimori et al.

(10) Patent No.: US 7,192,143 B2  
(45) Date of Patent: Mar. 20, 2007

(54) OPTICAL DEVICE AND PROJECTOR

(75) Inventors: Motoyuki Fujimori, Suwa (JP); Masami Murata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 240 days.

(21) Appl. No.: 11/047,754

(22) Filed: Feb. 2, 2005

(65) Prior Publication Data  
US 2005/0185244 A1    Aug. 25, 2005

(30) Foreign Application Priority Data  
Feb. 10, 2004    (JP) ............................. 2004-033584

(51) Int. Cl.  
G03B 21/16    (2006.01)  
G03B 21/18    (2006.01)  
G03B 21/26    (2006.01)

(52) U.S. Cl. .......................................... 353/54; 353/61

(58) Field of Classification Search ................. 353/52, 353/54, 60, 61; 362/318; 359/237  
See application file for complete search history.

(56) References Cited  
U.S. PATENT DOCUMENTS  
6,991,335 B2 * 1/2006 Kondo et al. ................. 353/54

2005/0168703 A1 * 8/2005 Fujimori et al. ............ 353/52

FOREIGN PATENT DOCUMENTS  
JP    01-159684 A    6/1989  
JP    03-174134 A    7/1991  
JP    2003-233441 A    8/2003

* cited by examiner

Primary Examiner—Melissa Jan Koval  
(74) Attorney, Agent, or Firm—Oliff & Berridge, PLC

(57) ABSTRACT

An optical device (44) includes: a optical modulator holder (4402) that has inside thereof a cooling chamber in which a cooling fluid is encapsulated, and holds a optical modulator in such a manner that heat can be transferred between the optical modulator holder and the cooling fluid within the cooling chamber; a plurality of fluid circulation members (448) that are connected to the cooling chamber of the optical modulator holder (4402) for mutual communication to guide the cooling fluid outside the cooling chamber and guide the cooling fluid inside the cooling chamber, again; and a main tank (445) that is arranged in the flow path of the cooling fluid in the plurality of fluid circulation members (448) and accumulates the cooling fluid. The main tank (445) has a cooling fluid inlet section for allowing the main tank (445) to be replenished with the cooling fluid.

23 Claims, 19 Drawing Sheets

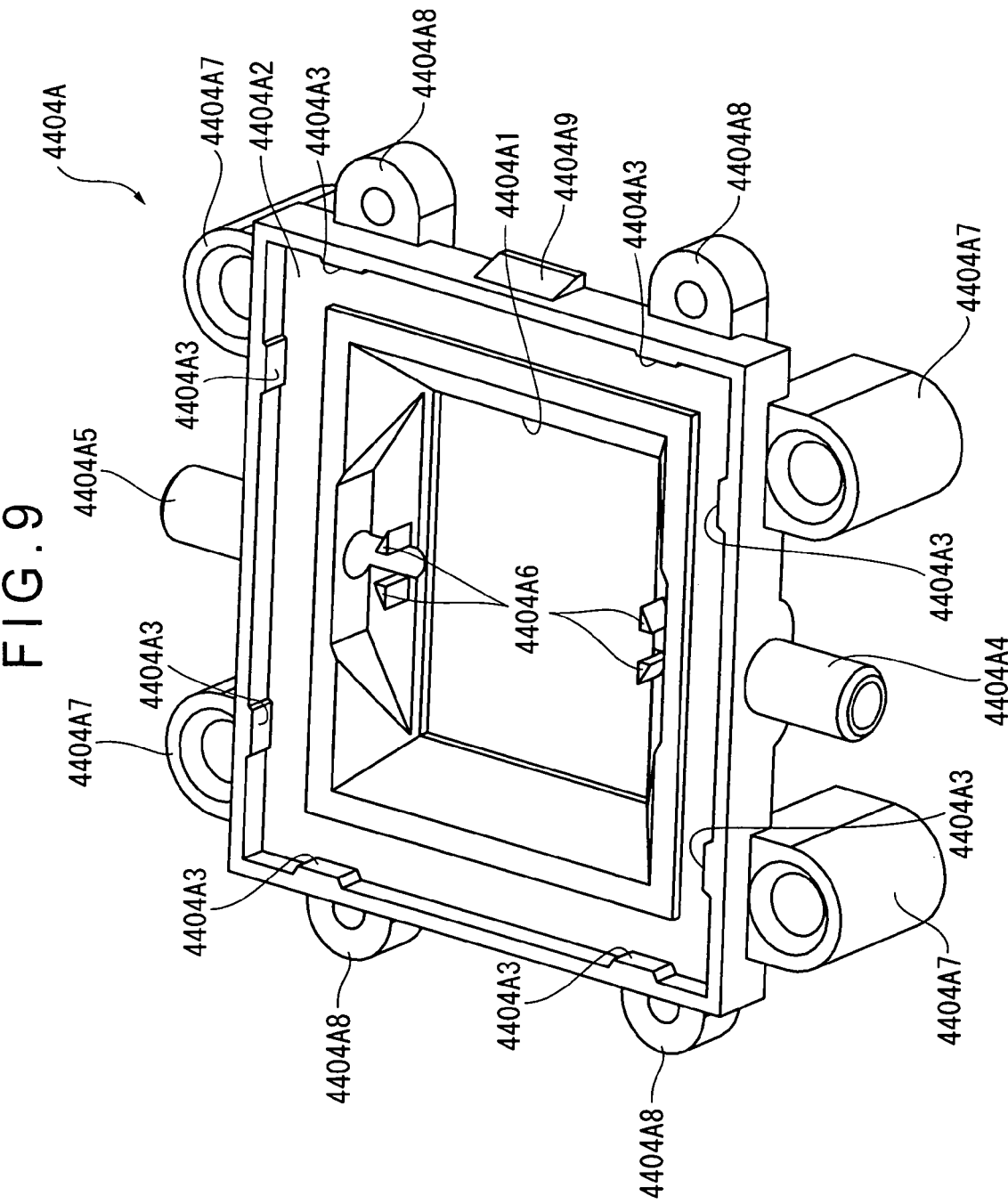

OPTICAL DEVICE AND PROJECTOR

BACKGROUND OF THE INVENTION

1. Field of the Invention

The present invention relates to an optical device and a projector.

2. Description of Related Art

Conventionally, a projector provided with a plurality of light modulation devices that modulate a light beam emitted from a light source in accordance with image information to form an optical image, a color synthesis optical device that synthesizes and emits the light beam that has been modulated in each light modulation device, and a projection optical device that projects the light beam that has been synthesized in the color synthesis optical device in an enlarged manner has been known.

As the light modulation device, e.g., an optical modulator of an active matrix drive type in which an electro-optic material such as a liquid crystal is encapsulated between a pair of substrates is adopted in general. More specifically, the pair of substrates that constitute the optical modulator includes a drive substrate and an opposed substrate. The drive substrate is arranged on the light beam emission side and has a data line, a scanning line, a switching device, a picture electrode and the like for applying a drive voltage to the liquid crystal formed thereon. The opposed substrate is arranged on the light beam incident side and has a common electrode, a black mask and the like formed thereon.

Further, a light incident side polarization plate and light emission side polarization plate that allow a light beam having a predetermined polarization axis to transmit therethrough are arranged on the light beam incident side and light beam emission side, respectively.

When the light beam emitted from the light source irradiates the optical modulator, the light is absorbed by a liquid crystal layer as well as by the data line and scanning line formed on the drive substrate or the black mask formed on the opposed substrate, so that the temperature of the optical modulator tends to be increased. Further, of the light beams emitted from the light source and transmitted through the optical modulator, the light beam that does not have a predetermined polarization axis is absorbed by the light incident side polarization plate and light emission side polarization plate, so that heat tends to be generated in the polarization plates.

To cope with the above problem, as the projector incorporating such an optical element, a configuration that includes a cooling device using a cooling fluid in order to alleviate the temperature rise in the optical element has been proposed (refer, for example, to Reference 1: Japanese Patent Laid-Open Publication No. Hei 3-174134).

More specifically, the cooling device disclosed in the Reference 1 is constituted by a casing having substantially a rectangular solid shape whose opposed end faces are opened, and the casing includes a fluid-filled cooling chamber inside thereof. An optical modulator is arranged on one end face side and a light incident side polarization plate is arranged on the other end face side. The optical modulator and light incident side polarization plate close the opened opposed end faces to form the cooling chamber. This configuration releases the heat, which has been generated in the optical modulator and light incident side polarization plate by a light beam emitted from a light source, directly into the cooling fluid.

However, in the cooling device disclosed in the Reference 1, a cooling fluid is encapsulated in the cooling chamber, so that the cooling fluid tends to be warmed by the heated optical modulator and polarization plate, allowing the warmed cooling fluid to stay in the cooling chamber. Accordingly, the temperature difference between the optical modulator and cooling fluid becomes smaller, making it difficult to effectively cool the optical modulator.

To solve the above problem, a configuration in which the cooling fluid is constantly circulated such that the cooling fluid in the cooling chamber is once guided outside the chamber and again introduced into the cooling chamber can be considerable. As the above configuration, a liquid cooling system disclosed in, for example, Reference 2 (Japanese Patent Laid-Open Publication No. 2003-233441) can be taken as an example.

In the liquid cooling system disclosed in the Reference 2, a pump, a jacket and a reserve tank are mounted on a radiator plate. The pump, jacket, and reserve tank are connected to each other through a tube or pipe so as to circulate the cooling fluid. By incorporating the liquid cooling system in the projector disclosed in the Pat. Reference 1, that is, by replacing the jacket constituting the liquid cooling system with the above cooling device, the cooling fluid is forcibly drawn out and introduced by the pump. As a result, the cooling fluid in the cooling chamber is constantly circulated to prevent the warmed cooling fluid from staying in the cooling chamber, thereby effectively cooling the optical modulator.

However, in the configuration as the above liquid cooling system in which the cooling fluid is circulated, the volume of the cooling fluid in the liquid cooling system tends to be reduced due to moisture transmission from the components in the circulation path. Here, a configuration in which extra cooling fluid is previously accumulated in the reserve tank in consideration of the decrease of the cooling fluid. It is necessary to request the manufacturer of the product to perform the replenishment of the cooling fluid in the case where the volume of the cooling fluid has fallen outside the guaranteed operating range after use during a predetermined period, imposing extra burden on the user or manufacturer. Further, when the user of the product himself or herself replenishes the liquid cooling system with a new cooling fluid, there is a possibility that the cooling fluid leaks into the inside of the product.

SUMMARY OF THE INVENTION

An object of the present invention is to provide an optical device capable of effectively cooling an optical modulator using a cooling fluid and in which the replenishment of the cooling fluid can easily be performed, and a projector.

According to an aspect of the present invention, an optical device including a optical modulator that modulates a light beam emitted from a light source in accordance with image information to form an optical image, includes: a optical modulator holder that has inside thereof a cooling chamber in which a cooling fluid is encapsulated and holds the optical modulator in such a manner that heat can be transferred to the cooling fluid in the cooling chamber; a plurality of fluid circulation members that are connected to the cooling chamber of the optical modulator holder for mutual communication to guide the cooling fluid outside the cooling chamber and guide the cooling fluid inside the cooling chamber, again; and a cooling fluid accumulation section that is arranged in the flow path of the cooling fluid in the plurality of fluid circulation members and accumulates the cooling fluid, the accumulation section having a cooling fluid inlet section for allowing the accumulation section to be replenished with the cooling fluid.

According to the present invention, the inlet section is formed in the accumulation section. Therefore, even if the volume of the cooling fluid to be circulated in the optical device is reduced, the user of the product himself or herself can easily replenish the accumulation section with a new cooling fluid through the inlet section. This eliminates the need of requesting the manufacturer to perform the replenishment of the cooling fluid, doing away with extra burden to be imposed on the user or manufacturer. Further, even if the user performs the replenishment of the cooling fluid, the configuration prevents the cooling fluid from leaking into the product including the optical device.

Further, the optical device includes the optical modulator holder, the circulation members, and the accumulation section. Thus, by encapsulating the cooling fluid in not only the cooling chamber of the optical modulator holder but also in the circulation members and the accumulation section, the volume of the cooling fluid can be increased, thereby increasing heat exchange rate between the optical modulator and cooling fluid. Further, by circulating the cooling fluid through the circulation members in the flow path from the cooling chamber of the light modulation holder to the accumulation section, the cooling fluid is prevented from being warmed by the optical modulator. As a result, the temperature difference between the optical modulator and cooling fluid is not reduced.

Therefore, it is possible to effectively cool the optical modulator with the cooling fluid, and to easily perform the replenishment of the cooling fluid, thereby achieving the object of the present invention.

Preferably, the optical device according to the present invention includes a cooling fluid replenishment section that accumulates a cooling fluid for replenishment and can be attached/detached to or from the accumulation section, the replenishment section having a cooling fluid outlet section for allowing the cooling fluid for replenishment to be delivered outside, and replenishing the accumulation section with the cooling fluid for replenishment through the outlet section and the inlet section when having been attached to the accumulation section.

According to the present invention, by attaching the replenishment section to the accumulation section, the accumulation section can be replenished with the cooling fluid through the outlet section of the replenishment section and the inlet section of the accumulation section. Therefore, even if the volume of the cooling fluid circulated through the circulation members in the flow path from the cooling chamber of the optical modulator holder to the accumulation section is reduced, the replenishment of the cooling fluid can be completed simply by attaching the replenishment section to the accumulation section. Further, even if the volume of the cooling fluid is reduced again after the attachment of the replenishment section to the accumulation section, the volume of the cooling fluid circulated in the optical device can be replenished simply by exchanging the replenishment section. Therefore, the user himself or herself can easily perform the replenishment of the cooling fluid.

Preferably, in the optical device according to the present invention, the inlet section includes a cooling fluid inlet hole through which the accumulation section can be replenished with the cooling fluid, and an inlet valve that closes the inlet hole. The outlet section includes a cooling fluid outlet hole through which the cooling fluid can be delivered outside the accumulation section, and an outlet valve that closes the outlet hole, and the accumulation section and the replenishment section have valve guide sections respectively that move the outlet valve and inlet valve in such a direction to open the inlet hole and the outlet hole in a state where the accumulation section and the replenishment section are attached to each other.

According to the present invention, before attachment of the replenishment section to the accumulation section, the inlet hole of the accumulation section is closed by the inlet valve and the outlet hole of the replenishment section is closed by the outlet valve. Therefore, the cooling fluid in the accumulation section is not exposed to the outside air through the inlet hole before attachment of the replenishment section to the accumulation section. Further, the cooling fluid for replenishment in the replenishment section is not exposed to the outside air through the outlet hole. As a result, it is possible to prevent dust or the like from being mixed into the cooling fluid. This prevents the dust or the like mixed into the cooling fluid from intercepting the light beam to be passed through the cooling chamber, so that image quality of the optical image formed in the optical device can be maintained in good condition.

Preferably, in the optical device according to the present invention, the inlet section includes an inlet valve biasing unit for biasing the inlet valve in such a direction to close the inlet hole.

Examples of the inlet valve biasing unit include biasing members such as a flat spring or coil spring, or elastic members having elasticity such as rubber.

According to the present invention, the inlet section includes the inlet valve biasing unit. Thus, when the replenishment section has been attached to the accumulation section, the valve guide section of the replenishment section moves the inlet valve to open the inlet hole. Further, at the time when the replenishment section is removed from the accumulation section, the inlet valve biasing unit biases the inlet valve to close the inlet hole. Therefore, the cooling fluid in the accumulation section does not leak into the outside through the inlet hole even while the replenishment section is replaced with a new one. This prevents the cooling fluid from leaking into the product including the optical device. Further, the cooling fluid in the accumulation section is not exposed to the outside air through the inlet hole, so that image quality of the optical image formed in the optical device can further be maintained in good condition.

Preferably, in the optical device according to the present invention, the outlet hole has: a sealed chamber in which the outlet valve is firmly attached thereto, the sealed chamber allowing the cooling fluid for replenishment to be encapsulated inside thereof by the outlet valve; and a distribution chamber in which the outlet valve is freely fitted thereto, the distribution chamber allowing the cooling fluid for replenishment to be distributed outside through the gap between the distribution chamber and the outlet valve, and the valve guide section of the accumulation section moves the outlet valve from the sealed chamber to the distribution chamber in a state where the accumulation section and the replenishment section are attached to each other.

According to the present invention, the sealed chamber and the distribution chamber are formed in the outlet hole. This configuration simplifies an opening and closing structure of the outlet hole, making it easy to manufacture the replenishment section.

Preferably, in the optical device according to the present invention, the outlet section includes an outlet valve biasing unit for biasing the outlet valve in such a direction to close the outlet hole.

As in the case of the inlet valve biasing means, examples of the outlet valve biasing unit include biasing members such as a flat spring or coil spring, or elastic members having elasticity such as rubber.

According to the present invention, the outlet section includes the outlet valve biasing unit. Thus, when the replenishment section has been attached to the accumulation section, the valve guide section of the accumulation section moves the outlet valve to open the outlet hole. Further, at the time when the replenishment section is removed from the accumulation section, the outlet valve biasing unit biases the outlet valve to close the outlet hole. Therefore, at the time when the replenishment section is removed from the accumulation section for exchange, the cooling fluid remaining in the replenishment section does not leak to the outside through the outlet hole. This prevents the cooling fluid from leaking into the product including the optical device.

Preferably, in the optical device according to the present invention, the inlet section includes a cooling fluid inlet hole for allowing the accumulation section to be replenished with the cooling fluid, and an elastic member that is engaged with the inlet hole to close the same.

Any material can be used as the elastic member as far as it has elasticity. For example, butylene-based rubber material can be taken as the elastic member.

In the present invention, a cooling fluid for replenishment is previously encapsulated in, for example, an injector. Thereafter, in a state where an elastic member is attached to the inlet hole, a needle of the injector is inserted through the elastic member and the inlet hole into the inside of the accumulation section. In this state, the cooling fluid for replenishment encapsulated in the injector is supplied to the accumulation section, thereby completing the replenishment of the cooling fluid. At this time, the hole in the elastic member that has been made by the needle is closed by the elastic force of the elastic member itself after the needle is pulled out of the elastic member, so that the cooling fluid in the accumulation section does not leak to the outside through the hole. Further, it is possible to prevent dust or the like from being mixed into the cooling fluid in the accumulation section through the hole.

This configuration is more advantageous than the configuration in which the replenishment of the cooling fluid is performed by attaching the replenishment section to the accumulation section, in that the replenishment of the cooling fluid can be completed only with the injector or the like, thereby reducing the cost involved in the replenishment of the cooling fluid. Since the structure of the accumulation section is thus simplified, it is possible to easily manufacture the accumulation section and, at the same time, to reduce the manufacturing cost of the accumulation section, leading to a reduction in the manufacturing cost of the optical device.

Preferably, in the optical device according to the present invention, the inlet section includes a cooling fluid inlet hole for allowing the accumulation section to be replenished with the cooling fluid, and a screw member that is screwed into the inlet hole to close the same.

In the present invention, a cooling fluid for replenishment is previously encapsulated in, for example, an injector. An engaging state between the screw member and the inlet hole is then released to remove the screw member from the inlet hole. Thereafter, a needle of the injector is then inserted through the inlet hole, and the cooling fluid in the injector is supplied to the accumulation section, thereby completing the replenishment of the cooling fluid.

This configuration is more advantageous than the configuration in which the replenishment of the cooling fluid is performed by attaching the replenishment section to the accumulation section, in that the replenishment of the cooling fluid can be completed only with the injector or the like, thereby reducing the cost involved in the replenishment of the cooling fluid. Since the structure of the accumulation section is thus simplified, it is possible to easily manufacture the accumulation section and, at the same time, to reduce the manufacturing cost of the accumulation section, leading to a reduction in the manufacturing cost of the optical device.

Preferably, in the optical device according to the present invention, the accumulation section includes a fluid volume display section that can display the volume of the inner cooling fluid.

According to the present invention, the accumulation section includes the fluid volume display section. Therefore, it is possible to visually confirm the volume of the cooling fluid in the accumulation section from outside the accumulation section, so that the user can easily determinate the replenishment timing of the cooling fluid and thereby can use the optical device free of worry.

Preferably, in the optical device according to the present invention, the accumulation section includes a cooling fluid inflow section that is connected to the plurality of fluid circulation members to allow the cooling fluid to flow in the accumulation section, and a cooling fluid outflow section that is connected to the circulation members to allow the cooling fluid to flow outside the accumulation section, and each of the inflow section and the outflow section has a tubular shape that can distribute the cooling fluid, and has one end that projects toward the inside of the accumulation section.

In the present invention, the accumulation section includes the inflow section and the outflow section. Each of the inflow section and the outflow section has one end projecting toward the inside of the accumulation section. Thus, it is possible to allow only the cooling fluid accumulated in the accumulation section to flow out to the outside of the accumulation section. For example, when the accumulation section is not completely filled with the cooling fluid, it is possible to prevent air from being mixed into the cooling fluid in the accumulation section and allow only the cooling fluid to flow out to the outside of the accumulation section.

Since not only the outflow section but also the inflow section projects toward the inside of the accumulation section, it is possible to surely allow the accumulated cooling fluid to flow out to the outside through the inflow section even in the case where the distribution direction of the cooling fluid is changed, that is, even when the cooling fluid is allowed to flow out through the inflow section to the outside and the cooling fluid is allowed to flow in through the outflow section.

Preferably, in the optical device according to the present invention, the inflow section and the outflow section are formed and arranged in such a manner that the inflow and outflow directions of the cooling fluid cross with each other substantially at right angles in plan view.

According to the present invention, it is possible to prevent the cooling fluid flowing in the accumulation section through the inflow section from directly flowing out to the outside of the accumulation section through the outflow section. As a result, it is possible to mix the flow-in cooling fluid with the cooling fluid in the accumulation section to equalize the temperature of the cooling fluid.

According to another aspect of the present invention, there is provided a projector including: a light source; the optical device of the present invention; a projection optical device that projects an optical image formed in the optical device in an enlarged manner; and an outer casing that houses the light source, the optical device, and the projection optical device at predetermined positions within the casing, respectively.

According to the present invention, the projector includes the light source, the above-described optical device of the present invention, the projection optical device, and the outer casing. Therefore, the same operational advantage as in the above optical device can be obtained.

Since the projector includes the optical device in which the replenishment of the cooling fluid can easily be performed, maintainability of the projector can be increased.

Preferably, in the projector according to the present invention, the outer casing has an opening formed to correspond to the position of the accumulation section, and a cap member is engaged with the opening to close the same.

According to the present invention, the replenishment of the cooling fluid circulated in the optical device can be completed simply by removing the cap member. For example, in the case of the above-described configuration in which the replenishment of the cooling fluid is performed by attaching the replenishment section to the accumulation section, by designing the entire device configuration such that the replenishment section can be inserted or removed into or from the projector through the opening, the replenishment section can be attached/detached to or from the accumulation section simply by removing the cap member. Further, for example, in the case of the configuration in which the replenishment of the cooling fluid is performed through the inlet hole by using the injector or the like, the needle of the injector can be inserted into the elastic member engaged with the inlet hole simply by removing the cap member. Further, in the case where the projector is suspended from the ceiling, it is possible to replenish the cooling fluid with the accumulation section simply by removing the cap member without the need of removing the projector from the ceiling. Further, simply by removing the cap member, the screw member engaged with the inlet hole can be removed and the needle of the injector can be inserted into the inlet hole.

Therefore, maintainability of the projector is remarkably increased.

BRIEF DESCRIPTION OF THE DRAWINGS

FIG. 9 is a perspective view showing a frame member according to the first embodiment when viewed from the light beam incident side;

DETAILED DESCRIPTION OF PREFERRED EMBODIMENTS

[First Embodiment]

A first embodiment of the present invention will be described below with reference to the accompanying drawings.

<Configuration of Projector>

Figure 1:
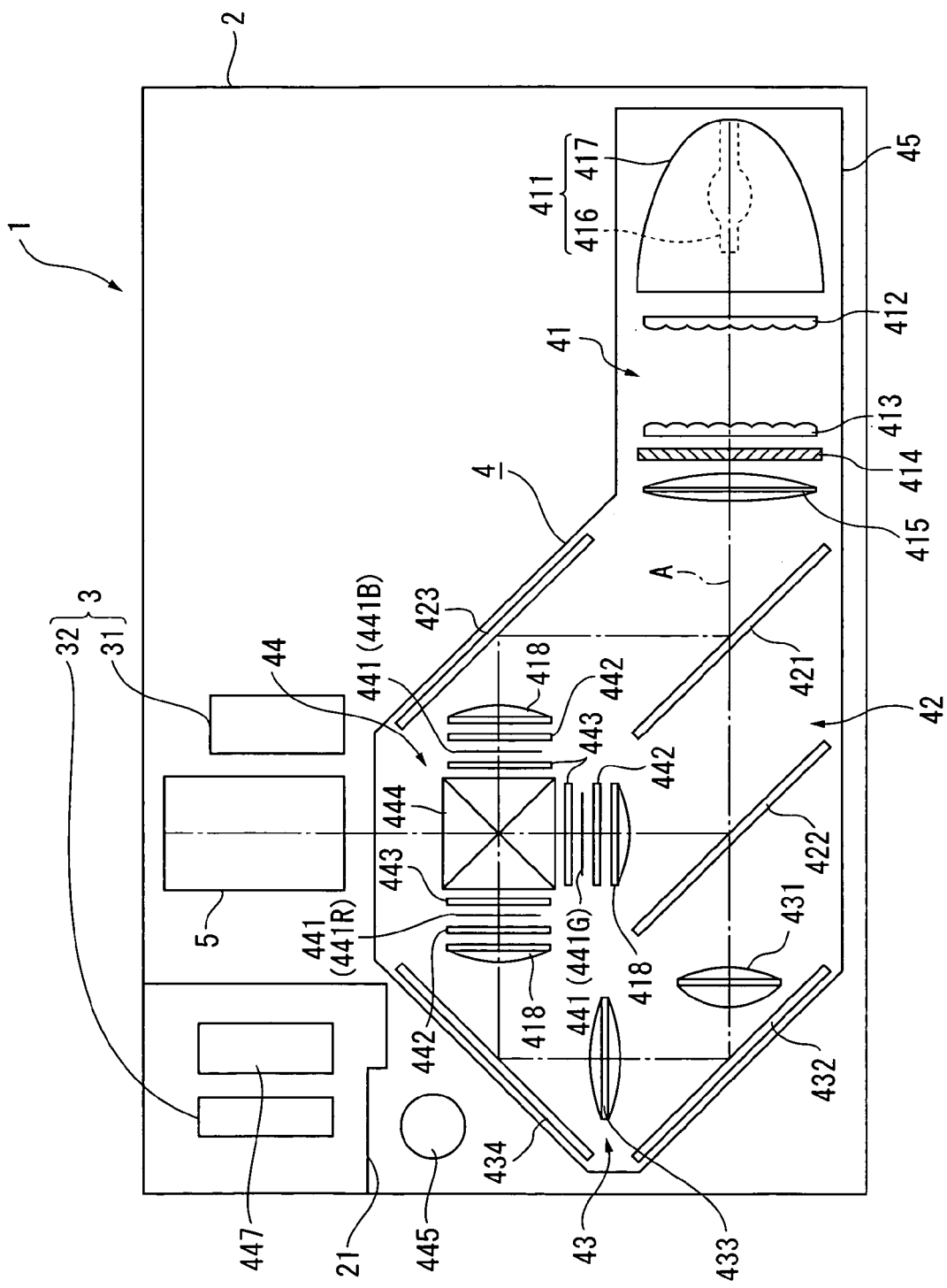
FIG. 1 is a view schematically showing a configuration of a projector according to embodiments of the present invention.

FIG. 1 is a view schematically showing a configuration of a projector 1.

The projector 1 modulates a light beam emitted from a light source in accordance with image information to form an optical image and projects the formed optical image on a screen in an enlarged manner. The projector 1 includes an outer case 2 serving as an outer casing, a cooling unit 3, an optical unit 4, and a projection lens 5 serving as a projection optical device.

In the outer case 2 of FIG. 1, although not shown, a power block, a lamp drive circuit and the like are arranged in the space other than the portions occupied by the cooling unit 3, optical unit 4, and projection lens 5.

The outer case 2 is formed of synthetic resin and the like and is formed in substantially a rectangular solid shape as a whole inside which the cooling unit 3, optical unit 4, and projection lens 5 are housed and arranged. Although not shown, the outer case 2 is constituted by an upper case and a lower case. The upper case constitutes an upper face, a front face, a rear face and side faces of the projector 1. The lower case constitutes a bottom face, a front face, a rear face and side faces of the projector 1. The upper and lower cases are fixed to each other by screws or the like.

The material of the outer case 2 is not limited to synthetic resin, but can be other materials, such as iron or the like.

Further, although not shown, the outer case 2 has an inlet (e.g., inlet 22 shown in FIG. 2) for the cooling unit 3 to introduce a cooling air inside of the projector 1 from the outside thereof, and an outlet for discharging the air that has been warmed in the projector 1.

Although details are described later, the outer case 2 has an opening formed at a position corresponding to a main tank of the optical device, which is described later, constituting the optical unit 4. A cap member is engaged with the opening.

Further, the outer case 2 has, as shown in FIG. 1, a partition 21 formed on the side of the projection lens 5 at a corner of the outer case 2. The partition 21 isolates a radiator (to be described later) of the optical device of the optical unit 4 from other components.

The cooling unit 3 blows air into a cooling passage formed in the projector 1 to cool the heat generated in the projector 1. The cooling unit 3 includes a sirocco fan 31 and an axial fan 32. The sirocco fan 31, which is located on the side of the projection lens 5, introduces cooling air into the inside of the projector 1 from the outside thereof through a not-shown inlet formed in the outer case 2 and sprays the cooling air onto a liquid crystal panel (to be described later) of the optical device of the optical unit 4. The axial fan 32, which is located inside of the partition 21 formed in the outer case 2, introduces cooling air into the inside of the projector 1 from the outside thereof through the inlet 22 (see FIG. 2) formed in the outer case 2 and sprays the cooling air onto a radiator (to be described later) of the optical unit 4.

Although not shown, the cooling unit 3 is assumed to include a light source (to be described later) of the optical unit 4, a power block, a cooling fan that cools a lamp drive circuit and the like in addition to the sirocco fan 31 and axial fan 32.

The optical unit 4 optically processes a light beam emitted from a light source and forms an optical image (color image) in accordance with image information. The optical unit 4, which has substantially an L-shape as viewed from above, extends along the rear face of the outer case 2 and along a side face of the outer case 2, as shown in FIG. 1. A detailed configuration of the optical unit 4 will be described later.

The projection lens 5 is formed as a combination lens obtained by combining a plurality of lenses. The projection lens 5 projects an optical image (color image) formed in the optical unit 4 on a not-shown screen in an enlarged manner.

<Detailed Configuration of Optical Unit>

The optical unit 4 includes, as shown in FIG. 1, an integrator illuminating optical system 41, a color-separating optical system 42, a relay optical system 43, an optical device 44, and an optical component casing 45 that houses the above optical components 41 to 44.

The integrator illuminating optical system 41 is an optical system for substantially uniformly illuminating the image formation areas of liquid crystal panels (to be described later) constituting the optical device 44. The integrator illuminating optical system 41 includes, as shown in FIG. 1, a light source 411, a first lens array 412, a second lens array 413, a polarization converter 414, and a superposing lens 415.

The light source 411 includes a source lamp 416 that emits a radial light beam and a reflector 417 that reflects the radial light emitted from the source lamp 416. A halogen lamp, a metal halide lamp, or a high-pressure mercury lamp is often used as the source lamp 416. A parabolic mirror is used as the reflector 417 in FIG. 1, however, a combination of an ellipsoidal mirror and a parallelizing lens (concave lens) may be used instead of the parabolic mirror. In this configuration, the light beam reflected by the ellipsoidal mirror and traveling towards the light beam emission side is changed into a parallel light beam by the parallelizing lens.

The first lens array 412 has small lenses arranged in a matrix, the lenses having substantially rectangular profile seen in the optical axis direction. Each of the small lenses of the first lens array 412 separates the light beam emitted from the light source 411 into partial lights.

The second lens array 413 has approximately the same configuration as the first lens array 412 in which the small lenses are arranged in matrix. The second lens array 413 as well as the superposing lens 415 focuses the image from the respective small lenses of the first lens array 412 onto liquid crystal panels (to be described later) of the optical device 44.

The polarization converter 414 is arranged between the second lens array 413 and the superposing lens 415. The polarization converter 414 converts the light from the second lens array 413 to substantially uniform polarized light.

Specifically, the respective partial light converted into substantially uniform polarized light by the polarization converter 414 is substantially superposed on the liquid crystal panels (to be described later) of the optical device 44 by the superposing lens 415. Since the projector using a liquid crystal panel for modulating polarized light can use only uniform polarized light, approximately half of the light from the light source 411 emitting random polarization light cannot be used. Therefore, the polarization converter 414 is used to convert the light emitted from the light source 411 to substantially uniform polarized light, thereby enhancing light utilization efficiency in the optical device 44.

The color separating optical system 42 includes, as shown in FIG. 1, two dichroic mirrors 421 and 422 and a reflection mirror 423, where the dichroic mirrors 421 and 422 separates the plurality of partial light beam emitted from the integrator illuminating optical system 41 into three color lights of red, green and blue.

The relay optical system 43 includes, as shown in FIG. 1, an incident side lens 431, a relay lens 433 and reflection mirrors 432 and 434, and introduces the red light separated by the color separating optical system 42 onto a liquid crystal panel for red light (to be described later) of the optical device 44.

At this time, the red light component and the green light component of the light beam irradiated from the integrator illuminating optical system 41 are transmitted through the dichroic mirror 421 of the color separating optical system 42 and the blue light component is reflected by the dichroic mirror 421. The blue light reflected by the dichroic mirror 421 is reflected by the reflection mirror 423, which reaches to a liquid crystal panel for blue light (to be described later) of the optical device 44 through a field lens 418. The field lens 418 converts the respective partial lights emitted from the second lens array 413 into a light beam parallel to central axis (main beam) thereof. The field lenses 418 provided on the light incident side of other liquid crystal panels for green light and red light function in the same manner.

Of the red light and the green light transmitted through the dichroic mirror 421, the green light is reflected by the dichroic mirror 422 to reach the liquid crystal panel for green light (to be described later) of the optical device 44 through the field lens 418. On the other hand, the red light transmits through the dichroic mirror 422 to pass the relay optical system 43 and reach the liquid crystal panel for red light (to be described later) of the optical device 44 through the field lens 418. Incidentally, the relay optical system 43 is used for the red light in order to prevent decrease in utilization efficiency of light on account of light diffusion or the like caused by longer length of the optical path of the red light than the length of the optical path of the other color lights, in other words, in order to directly transmit the partial lights incident on the incident side lens 431 to the field lens 418.

The optical device 44 integrally includes, as shown in FIG. 1, three liquid crystal panels 441 (liquid crystal panel for red light 441R, liquid crystal panel for green light 441G, and liquid crystal panel for blue light 441B), as three optical modulators, incident side polarization plates 442, emission side polarization plates 443 arranged respectively on the light beam incident side and light beam emission side of the light crystal panels 441, and a cross dichroic prism 444.

The optical device 44 further includes a main tank, a fluid pressure delivery section, a radiator, a fluid circulation member, a fluid branch section, an optical modulator holder and an intermediate tank in addition to the liquid crystal panels 441, incident side polarization plates 442, emission side polarization plates 443, and cross dichroic prism 444.

The liquid crystal panels 441 include, although not shown, a pair of transparent glass substrates with liquid crystal, which is an electro-optic material, encapsulated therebetween. The orientation of the liquid crystal is adjusted on accordance with a drive signal output from a not-shown controller, thereby modulating the polarizing direction of the polarized light beam emitted from the incident side polarization plate 442.

Respective color lights which polarizing directions have been aligned to a predetermined direction in the polarization converter 414 are incident onto the incident side polarization plate 442. The incident side polarization plate 442 only transmits a polarized light in substantially the same direction as the polarization axis of the light beam whose polarizing direction has been aligned by the polarization converter 414 among the incident light, and absorbs the other light beam. The incident side polarization plate 442 includes a translucency substrate formed of sapphire glass or crystal liquid or the like attached with a polarization film.

The emission side polarization plate 443 is constructed in approximately the same manner as the incident side polarization plate 442, which transmits only a light beam having a polarization axis perpendicular to the transrmission axis of the light beam in the incident side polarization plate 442 among the light beam emitted from the liquid crystal panels 441 and absorbs the other light beam.

The cross dichroic prism 444 combines the optical image emitted from the emission side polarization plate 443 and modulated for respective color lights to form a color image. The cross dichroic prism 444 has substantially a square shape viewed from above constituted by four rectangular prisms bonded to each other. Two dielectric multi-layer films are formed along the bonded boundary between the four rectangular prisms of the cross dichroic prism 444. The dielectric multi-layer films reflect color lights emitted from the liquid crystal panels 441R and 441B and passed through the emission side polarization plate 443, and transmit the color light emitted from the liquid crystal panel 441G and passed through the emission side polarization plate 443. In this manner, restive color lights that have been modulated by the three liquid crystal panels 441R, 441G and 441B are combined to form a color image.

Figure 2:
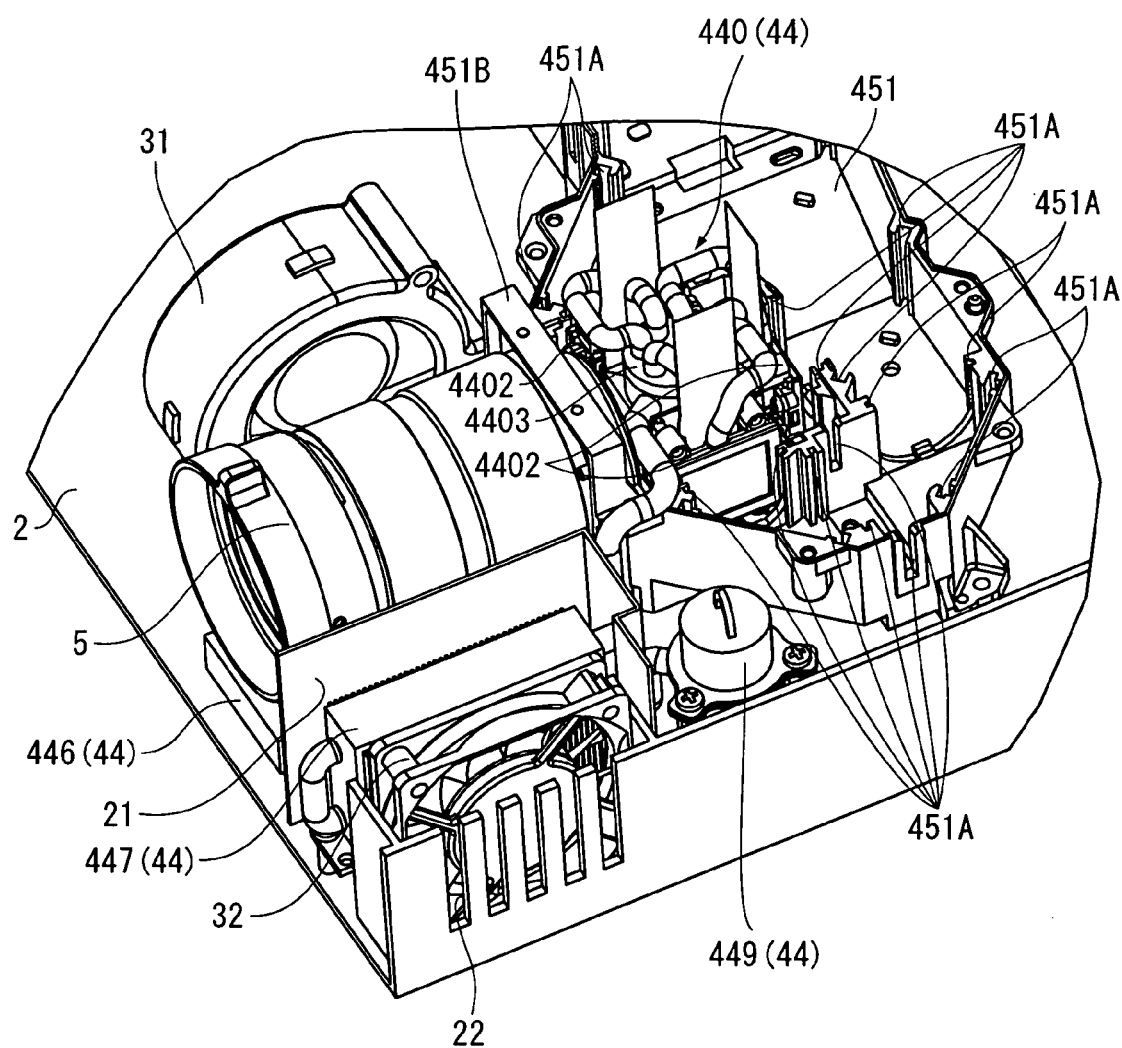
FIG. 2 is a perspective view showing a part of the inside of the projector according to a first embodiment when viewed from above.

FIG. 2 is a perspective view showing a part of the inside of the projector 1 when viewed from above. In FIG. 2, only an optical device main body (to be described later) of the optical device 44 is shown as an optical component in the optical component casing 45, and other optical components 41 to 43 are omitted for the sake of simplicity.

Figure 3:
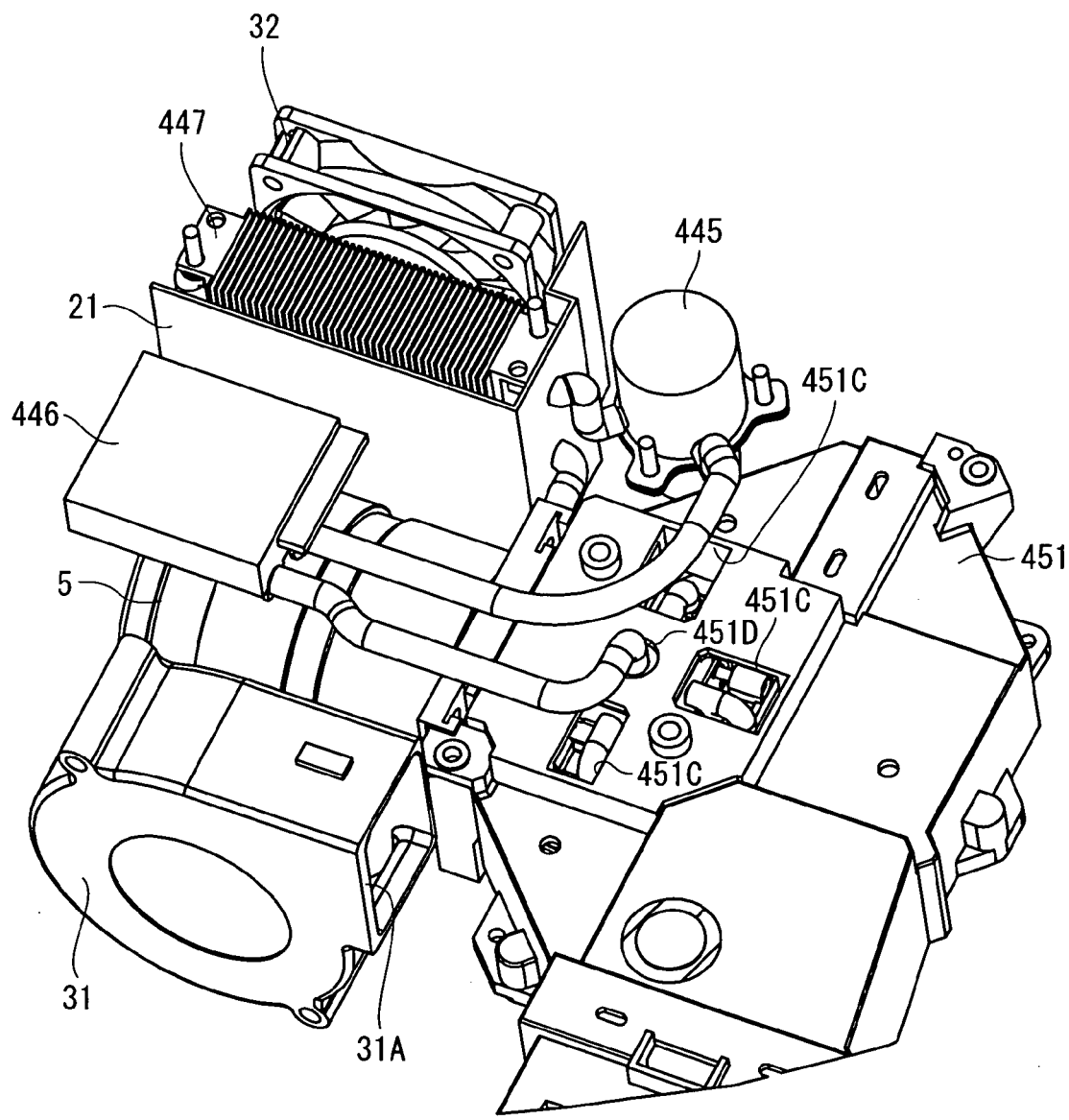
FIG. 3 is a perspective view showing a part of the inside of the projector according to the first embodiment when viewed from below.

FIG. 3 is a perspective view showing a part of the inside of the projector 1 when viewed from below.

The optical component casing 45 is formed of, for example, a metal member, inside of which a predetermined illumination optical axis A has been set as shown in FIG. 1. The above-mentioned optical components 41 to 43 and an optical device main body (to be describe later) of the optical device 44 are housed and arranged at the predetermined positions with respect to the illumination optical axis A. The material of the optical component casing 45 is not limited to a metal member, but can be other materials as long as it is a material having thermal conductivity. As shown in FIG. 2, the optical component casing 45 is constituted by a vessel-like component housing member 451 that houses the optical components 41 to 43 and an optical device main body (to be described later) of the optical device 44, and a not-shown cap-like member that closes the opening portion of the component housing member 451.

The component housing member 451 constitutes the bottom face, front face and side faces of the optical component casing 45.

In the component housing member 451, grooves 451A for engaging the above-mentioned optical components 412 to 415, 418, 421 to 423, and 431 to 434 are formed on the inside walls of the side surfaces. The above components are engaged in a sliding manner with the grooves 451 A from above.

Further, as shown in FIG. 2, a projection lens positioning section 451B for positioning the projection lens 5 at a predetermined position with respect to the optical unit 4 is formed in a front portion of the side surface. The projection lens positioning section 451 B is formed into substantially a rectangular shape viewed from above and has a not-shown circular hole formed at the position corresponding to a light beam emission position of the optical device 44 in the central portion when viewed from above. A color image formed in the optical unit 4 enters the projection lens 5 through the hole and is projected by the projection lens 5 in an enlarged manner.

Further, as shown in FIG. 3, the component housing member 451 has three holes 451C and a hole 451D formed on the bottom surface thereof. The three holes 451C are formed at the positions corresponding to those of the liquid crystal panels 441 of the optical device 44. The hole 451D is formed at the position corresponding to that of a cooling fluid inflow section of the fluid branch section (to be described later) of the optical device 44. Cooling air introduced from outside of the projector I into the inside thereof by the sirocco fan 31 of the cooling unit 3 is discharged from a discharge port 31 A (FIG. 3) of the sirocco fan 31 and introduced into the holes 451C through a not-shown duct.

<Configuration of Optical Device>

Figure 4:
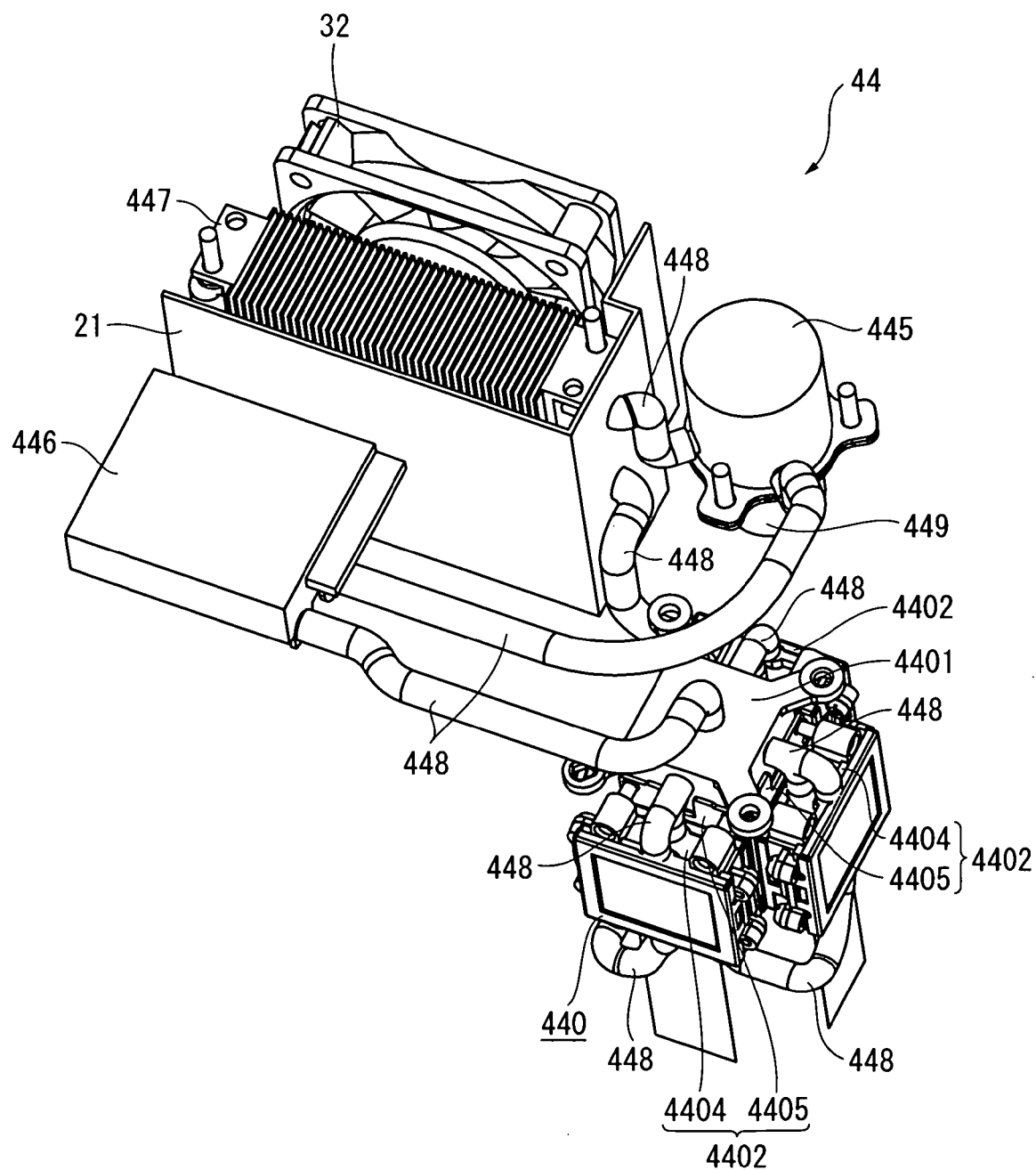
FIG. 4 is a perspective view showing an optical device according to the first embodiment when viewed from below.

FIG. 4 is a perspective view showing the optical device 44 when viewed from below.

As shown in FIGS. 2 to 4, the optical device 44 includes an optical device main body 440 in which the liquid crystal panels 441, incident side polarization plates 442, emission side polarization plates 443, and cross dichroic prism 444 are integrally formed, a main tank 445 (FIG. 3 and FIG. 4) serving as a cooling fluid accumulation section, a replenishment tank 449 (FIG. 2 and FIG. 4) serving as a cooling fluid replenishment section, a fluid pressure delivery section 446, a radiator 447, and a plurality of fluid circulation members 448.

The fluid circulation members 448 are formed of aluminum tubular member so as to circulate a cooling fluid inside thereof and are connected to the members 440 and 445 to 447 to circulate the cooling fluid. The heat generated in the liquid crystal panels 441, incident side polarization plates 442, and emission side polarization plates 443 constituting the optical device main body 440 is cooled by the circulated cooling fluid.

In the present embodiment, ethylene glycol, which is a transparent non-volatile liquid, is used as a cooling fluid. The cooling fluid to be used is not limited to the ethylene glycol and other liquids can be used as a cooling fluid.

In the following, members 440, 445 to 447, and 449 will be described starting from the upstream side of the liquid crystal panel 441 along the passage of the circulated cooling fluid.

<Structure of Main Tank and Replenishment Tank>

Figure 5A:
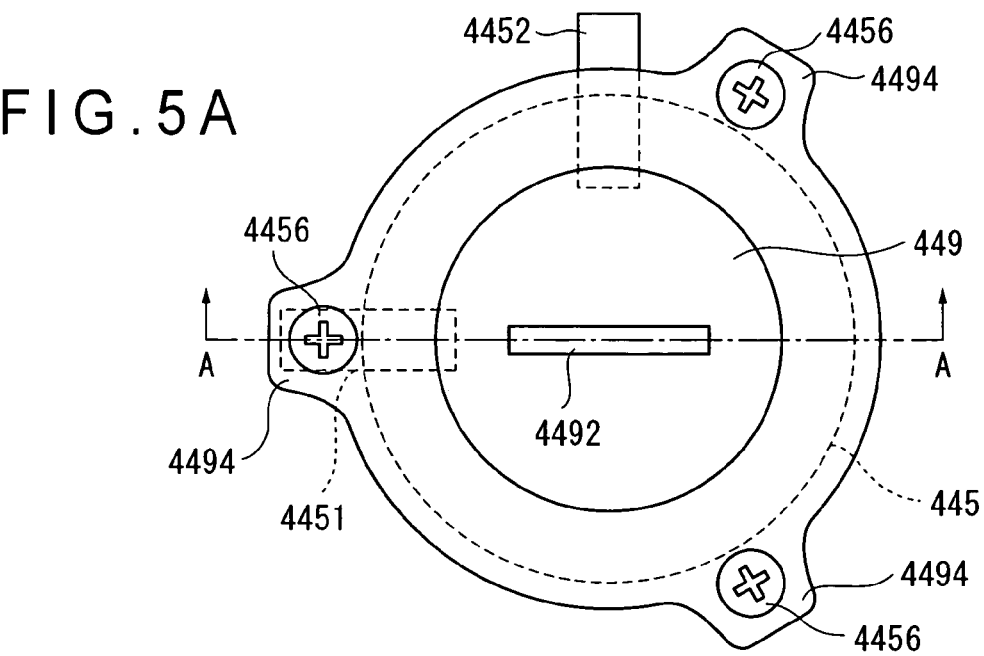
FIG. 5A is a plan view showing a structure of a main tank and a replenishment tank according to the first embodiment.
Figure 5B:
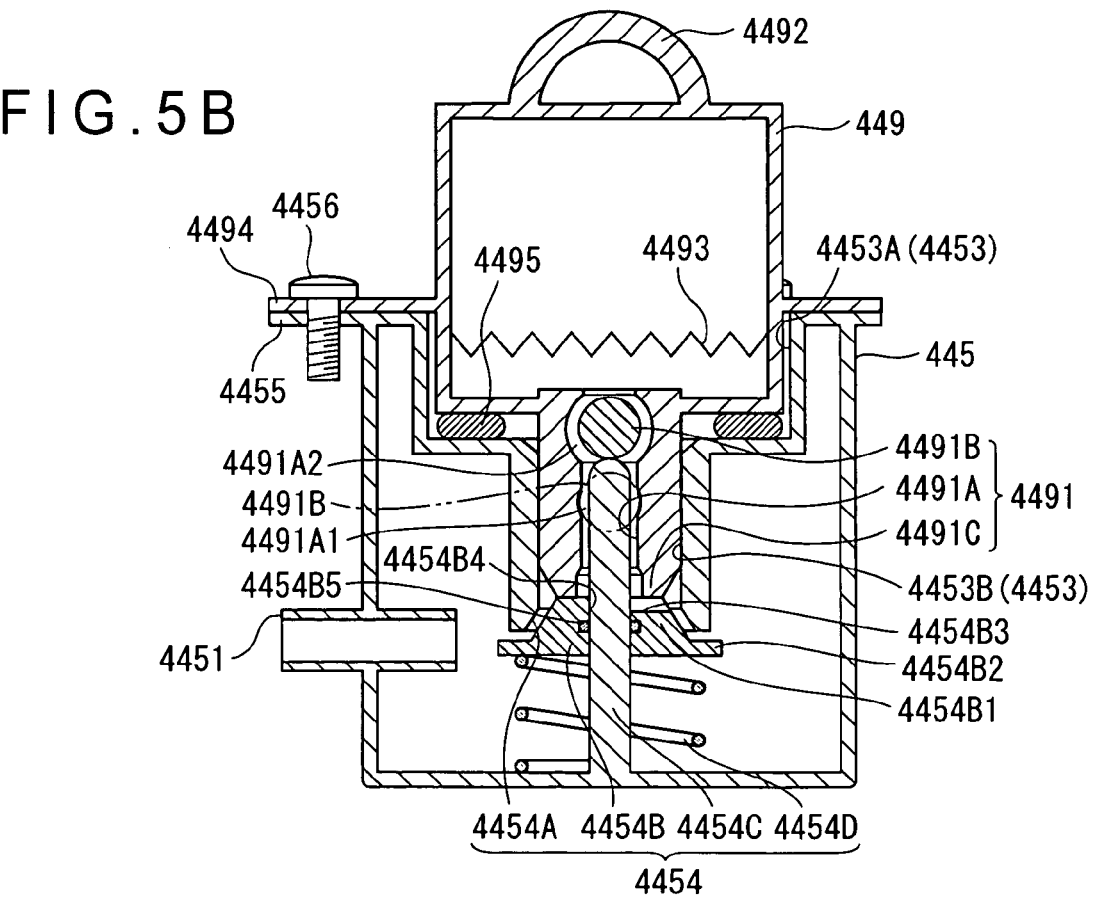
FIG. 5B is a cross-sectional view taken along the line A—A in FIG. 5A.

FIG. 5A and FIG. 5B show structures of the main tank 445 and the replenishment tank 449 connected to the main tank 445. More specifically, FIG. 5A is a plan view showing structure of the main tank 445 and replenishment tank 449 when viewed from above. FIG. 5B is a cross-sectional view taken along the line A—A in FIG. 5A.

The main tank 445 has substantially a cylindrical shape and is formed of an aluminum vessel-like member. The main tank 445 can temporarily accumulate a cooling fluid and can be replenished with the cooling fluid from the outside thereof.

The main tank 445 has, as shown in FIG. 5A, a cooling fluid inflow section 4451 and a cooling fluid outflow section 4452 formed on the lower side of the main tank 445 in a cylindrical axis direction thereof. The inflow section 4451 allows inflow of a cooling fluid, and the outflow section 4452 allows outflow of a cooling fluid in the main tank 445 to the outside thereof.

The inflow section 4451 and the outflow section 4452 are formed of substantially a tubular member having a pipe diameter smaller than the pipe diameter of the fluid circulation member 448 and project inside and outside the main tank 445. One end of the fluid circulation member 448 is connected to the one end of the inflow section 4451 that projects outside the main tank 445 to allow inflow of a cooling fluid from outside into the main tank 445 through the fluid circulation member 448. Further, one end of the fluid circulation member 448 is connected to the one end of the outflow section 4452 that projects outside the main tank 445 to allow outflow of a cooling fluid from inside the main tank 445 to outside through the fluid circulation member 448.

The other ends of the inflow section 4451 and the outflow section 4452 that project inside extend toward the cylindrical axis of the main tank 445 and cross each other substantially at right angles as viewed from above, as shown in FIG. 5A.

A substantially cylindrical concave portion 4453 is formed in substantially the central portion of the upper face of the main tank 445. The concave portion 4453 is formed in a step-like manner, that is, the concave portion 4453 includes two substantially cylindrical concave portions 4453A and 4453B having different diameters from each other to fit the outer shape of the replenishment tank 449 and having the same cylindrical axis. The bottom of the replenishment tank 449 can be freely fitted to the larger-diameter concave portion 4453A. An outlet section (to be described later) of the replenishment tank 449 can be inserted into the smaller-diameter concave portion 4453B. At the bottom face of the concave portion 4453B, a cooling fluid inlet section 4454 allowing injection of a cooling fluid from the replenishment tank 449 is formed, as shown in FIG. 5B.

The inlet section 4454 includes, as shown in FIG. 5B, a cooling fluid inlet hole 4454A, an inlet valve 4454B, a valve guide section 4454C, and a coil spring 4454D serving as an inlet valve biasing unit.

The inlet hole 4454A, which is formed at the bottom of the concave portion 4453B, serves as a hole of the main tank 445 to allow injection of a cooling fluid from the replenishment tank 449. Inside corner sections of the inlet hole 4454A are subjected to chamfering, as shown in FIG. 5B, to allow the inlet valve 4454B to come in contact with the chamfered portions.

The inlet valve 4454B has a configuration obtained by integrating two cylindrical members 4454B1 and 4454B2 having different diameters and having the same cylindrical axis between them and is configured to be able to move along the valve guide section 4454C and to close the inlet hole 4454A.

The cylindrical member 4454B1 is positioned above the cylindrical member 4454B2 and has a diameter smaller than the cylindrical member 4454B2.

Outside corner sections of the cylindrical member 4454B1 are subjected to chamfering, as shown in FIG. 5B, to come in contact with the above-mentioned chamfered inside faces of the inlet hole 4454A.

A cut 4454B3 is formed in the area from substantially the center portion to the outer circumference of the cylindrical member 4454B1 at a part of the upper face thereof, as shown in FIG. 5B. When the inlet valve 4454B has been released from the inlet hole 4454A, the main tank 445 is replenished with the cooling fluid flowing from the replenishment tank 449 through the cut 4454B3.

The cylindrical member 4454B2 has a diameter substantially the same as or slightly larger than the diameter of the concave portion 4453B. When the cylindrical member 4454B1 has come into contact with the inside face of the inlet hole 4454A, the upper end face of the cylindrical member 4454B2 comes into contact with the leading end portion of the inlet hole 4454A.

As described above, the contact of the cylindrical member 4454B1 with the inside face of the inlet hole 4454A and the contact of the cylindrical member 4454B2 with the leading end portion of the inlet hole 4454A allow the inlet valve 4454B to completely close the inlet hole 4454A.

Further, an insertion hole 4454B4 for allowing the valve guide section 4454C to be inserted thereinto is formed at the axial position of the inlet valve 4454B. An O-ring 4454B5 is disposed at substantially the central portion in the axial direction of the insertion hole 4454B4 to seal a gap between the insertion hole 4454B4 and the valve guide section 4454C. The O-ring 4454B5 prevents a cooling fluid from leaking from the gap between the inlet valve 4454B and the valve guide section 4454C, and allows the inlet valve 4454B to move along the valve guide section 4454C.

The valve guide section 4454C, which is substantially a cylindrical rod-like member, is vertically arranged at substantially the center position of the bottom face of the main tank 445 and allows a outlet valve (to be described later) to move in a direction to open a cooling fluid outlet hole (to be described later) of the replenishment tank 449 in a state where the replenishment tank 449 is attached to the main tank 445.

The coil spring 4454D has an end brought into contact with the bottom face of the main tank 445 and the other end brought into contact with the bottom face of the inlet valve 4454B to bias the inlet valve 4454B in a direction to close the inlet hole 4454A. That is, in a state where the replenishment tank 449 is not attached to the main tank 445, the coil spring 4454D biases the inlet valve 4454B to allow the inlet valve 4454B to close the inlet hole 4454A.

Three fixing sections 4455 extending outside the main tank 445 are formed on the upper face of the main tank 445, as shown in FIG. 5A and FIG. 5B. A screw 4456 (FIG. 5A and FIG. 5B) is inserted through each of the fixing sections 4455 and the bottom face of the outer case 2 and tightened, with the result that the main tank 445 is fixed to the outer case 2.

The replenishment tank 449 has substantially a cylindrical shape and is formed of an aluminum vessel-like member. The replenishment tank 449 is configured to accumulate a cooling fluid for replenishment and can replenish the main tank 445 with an internal cooling fluid.

A cooling fluid outlet section 4491 for allowing the internal cooling fluid to be delivered to the outside of the replenishment tank 449 is formed at substantially the center position of the bottom face of the replenishment tank 449, as shown in FIG. 5B. The outlet section 4491 has substantially a cylindrical shape that protrudes downwardly in FIG. 5B and is inserted into the concave portion 4453B of the main tank 445 at the time of attachment of the replenishment tank 449 to the main tank 445. The outlet section 4491 includes, as shown in FIG. 5B, a cooling fluid outlet hole 4491A and a outlet valve 4491B, and valve guide section 4491C.

The outlet hole 4491A, which penetrates through the outlet section 4491 to connect the inside of the replenishment tank 449 to the outside thereof, can deliver an internal cooling fluid to the outside. A sealed chamber 4491A1 and a distribution chamber 4491A2 are formed on the inside face of the outlet hole 4491A, as shown in FIG. 5B.

The sealed chamber 4491A1 is positioned below the distribution chamber 4491A2 in FIG. 5B and has a shape corresponding to the outer shape of the outlet valve 4491B. When the outlet valve 4491B is positioned to the sealed chamber 4491A1, the inner face of the sealed chamber 4491A1 is tightly fitted to the outlet valve 4491B, so that the outlet hole 4491A is closed by the outlet valve 4491B. When the replenishment tank 449 is not in use, the outlet valve 4491B is positioned to the sealed chamber 4491A1 to prevent a cooling fluid from being delivered through the outlet hole 4491A.

The distribution chamber 4491A2 has a shape larger than the outer shape of the outlet valve 4491B. Accordingly, when the outlet valve 4491B is positioned to the distribution chamber 4491A2, a gap is generated between the inner face of the distribution chamber 4491A2 and the outlet valve 4491B to allow a cooling fluid to be delivered outside through the gap.

The outlet valve 4491B has substantially a sphere-like shape and is moved from the sealed chamber 4491A1 to the distribution chamber 4491A2 by being pressed in the valve guide section 4454C of the main tank 445.

The valve guide section 4491C is positioned at the leading end of the outlet section 4491. When the replenishment tank 449 is attached to the main tank 445, the valve guide section 4491C comes in contact with the upper face of the inlet valve 4454B of the main tank 445 to move the inlet valve 4454B in a direction (downward direction in FIG. 5B) to open the inlet hole 4454A of the main tank 445.

In a state where the replenishment tank 449 has been attached to the main tank 445 and the valve guide section 4454C of the main tank 445 has been inserted into the outlet hole 4491A of the replenishment tank 449, the leading end of the valve guide section 4454C extends up to above the sealed chamber 4491A1. That is, at the time when the replenishment tank 449 is attached to the main tank 445, the valve guide section 4454C is inserted into the outlet hole 4491A of the replenishment tank 449, and the leading end of the valve guide section 4454C is allowed to come into contact with the outlet valve 4491B positioned to the sealed chamber 4491A1 of the replenishment tank 449. Thereafter, the replenishment tank 449 is further pressed against the main tank 445 to allow the valve guide section 4454C to press the outlet valve 4491B, so that the outlet valve 4491B is moved from the sealed chamber 4491A1 to the distribution chamber 4491A2, thereby opening the outlet hole 4491A of the replenishment tank 449. At this time, the valve guide section 4491C of the replenishment tank 449 is brought into contact with the upper face of the inlet valve 4454B of the main tank 445 to press down the inlet valve 4454B, thereby opening the inlet hole 4454A of the main tank 445. When the outlet hole 4491A and the inlet hole 4454A are opened as described above, the main tank 445 is replenished with the cooling fluid that flows from the replenishment tank 449 through the outlet hole 4491A, the cut 4454B3 of the inlet valve 4454B, and the inlet hole 4454A.

A handle 4492 is formed on the upper face of the replenishment tank 449, as shown in FIG. 5A and FIG. 5B. By gripping the handle 4492, it is possible to easily insert the replenishment tank 449 into the main tank 445 from above.

Further, a filter 4493 is provided inside of the replenishment tank 449, as shown in FIG. 5B, to remove dirt and dust in the cooling fluid to be replenished to the main tank 445.

Further, three fixing sections 4494 extending outside the replenishment tank 449 are formed on the outside face of the replenishment tank 449 in such a manner to correspond to the fixing sections 4455 of the main tank 445, as shown in FIG. 5A and FIG. 5B. The screw 4456 is inserted through each of the fixing sections 4494 of the replenishment tank 449 and the fixing sections 4455 of the main tank 445 and the bottom face of the outer case 2 and tightened, with the result that the replenishment tank 449 and the main tank 445 are tightly attached to each other and, at the same time, the replenishment tank 449 and the main tank 445 are fixed to the outer case 2. At this time, an O-ring 4495 is interposed between the concave portion 4453A of the main tank 445 and the bottom face of the replenishment tank 449 to prevent a cooling fluid from leaking in the space between the main tank 445 and the replenishment tank 449.

The main tank 445 and the replenishment tank 449 are arranged in substantially a triangle area as viewed from above, which is constituted by the optical component casing 45 and the inner face of the outer case 2, as shown in FIG. 1 and FIG. 2. By setting the main tank 445 to the area, the storage efficiency in the outer case 2 can be increased to eliminate the need of increasing the size of the projector 1.

Figure 6:
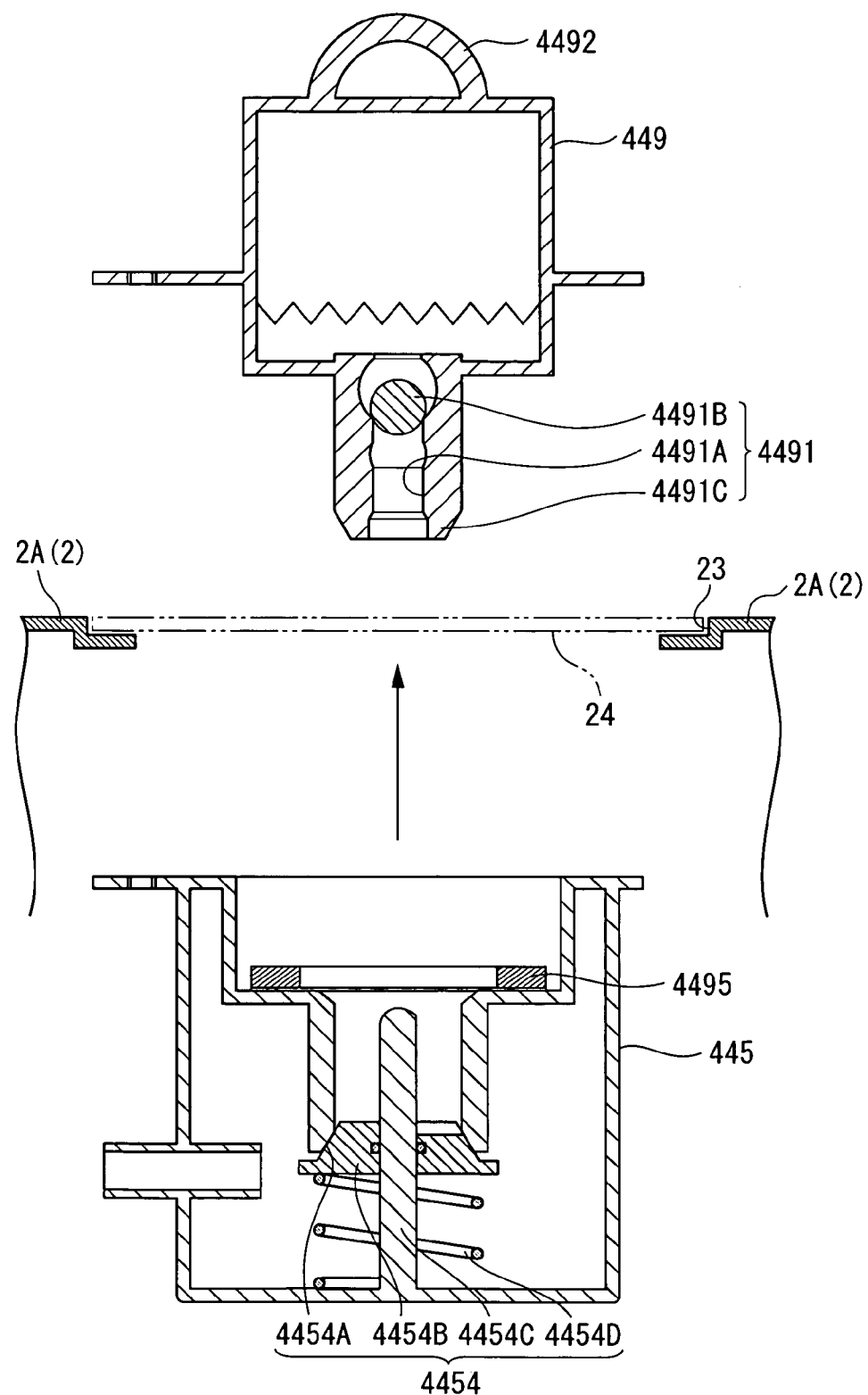
FIG. 6 is a cross-sectional view for explaining a method of exchanging the replenishment tank in the first embodiment.

FIG. 6 is a cross-sectional view for explaining a method of exchanging the replenishment tank 449.

As shown in FIG. 6, an opening 23 is formed on an upper case 2A of the outer case 2 at the area corresponding to the area in which the main tank 445 and the replenishment tank 449 are positioned to allow the replenishment tank 449 to be inserted into or removed from the projector 1. A cap member 24 is engaged with the opening 23. The shapes of the opening 23 and the cap member 24 are not particularly limited and any shape such as circular shape or rectangular shape can be adopted. Further, the engagement structure between the opening 23 and the cap member 24 is not particularly limited.

When a cooling fluid in the main tank 445 and the replenishment tank 449 get low and the replenishment tank 449 must be exchanged with a new one, the cap member 24 is removed from the upper case 2A, firstly. Thereafter, a driver or the like is inserted through the opening 23 and the screws 4456 (FIG. 5A and FIG. 5B) are taken out using the driver.

The replenishment tank 449 is then drawn upward (direction denoted by the arrow in FIG. 6) with the handle 4492 thereof gripped by a hand to remove the replenishment tank 449 through the opening 23 of the upper case 2A. At this time, a pressing force applied by the valve guide section 4491C of the replenishment tank 449 to the inlet valve 4454B of the main tank 445 is released, so that the inlet valve 4454B of the main tank 445 is forced to move upward by a biasing force of the coil spring 4454D. As a result, the inlet hole 4454A of the main tank 445 is closed by the inlet valve 4454B.

After a new replenishment tank 449 has been attached to the main tank 445 according to the above-mentioned attachment method, the cap member 24 is set to the opening 23 of the outer case 2.

<Structure of Fluid Pressure Delivery Section>

The fluid pressure delivery section 446 takes in a cooling fluid accumulated in the main tank 445 and forcibly delivers the taken-in cooling fluid to outside. Therefore, as shown in FIG. 4, the fluid pressure delivery section 446 is connected to the other end of the fluid circulation member 448 connected to the outflow section 4452 of the main tank 445 for mutual communication. Further, the fluid pressure delivery section 446 is connected to one end of another fluid circulation member 448 for mutual communication in order to deliver a cooling fluid to outside.

Although not specifically shown, the fluid pressure delivery section 446 has, for example, a configuration in which an impeller is arranged in an aluminum hollow member having substantially a rectangular solid shape. Under the control of a not-shown controller, when the impeller is rotated, the cooling fluid accumulated in the main tank 445 is forcibly taken in the fluid pressure delivery section 446 through the circulation member 448, and the taken-in cooling fluid is forcibly delivered to outside through the circulation member 448. In the configuration described above, the thickness of the impeller in the fluid pressure delivery section 446 in the rotation shaft direction can be reduced, so that it is possible to arrange the fluid pressure delivery section 446 in a limited space within the projector 1. In the present embodiment, the fluid pressure delivery section 446 is arranged below the projection lens 5, as shown in FIG. 2 and FIG. 3.

<Configuration of Optical Device Main Body>

The optical device main body 440 includes three liquid crystal panels 441, three incident side polarization plates 442, three emission side polarization plates 443, and a cross dichroic prism 444. Further, as shown in FIG. 2 or FIG. 4, the optical device main body 440 includes a fluid branch section 4401 (FIG. 4), three optical modulator holders 4402, and an intermediate tank 4403 (FIG. 2).

<Structure of Fluid Branch Section>

Figure 7A:
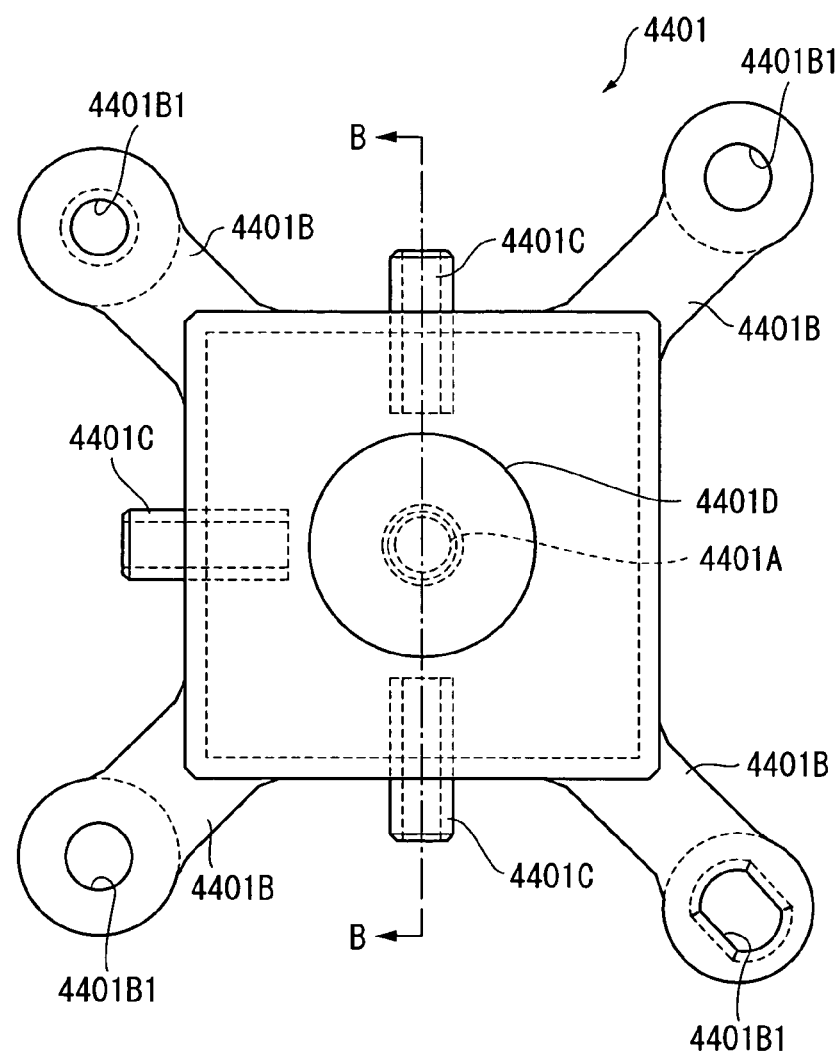
FIG. 7A is a plan view showing a structure of a fluid branch section according to the first embodiment.
Figure 7B:
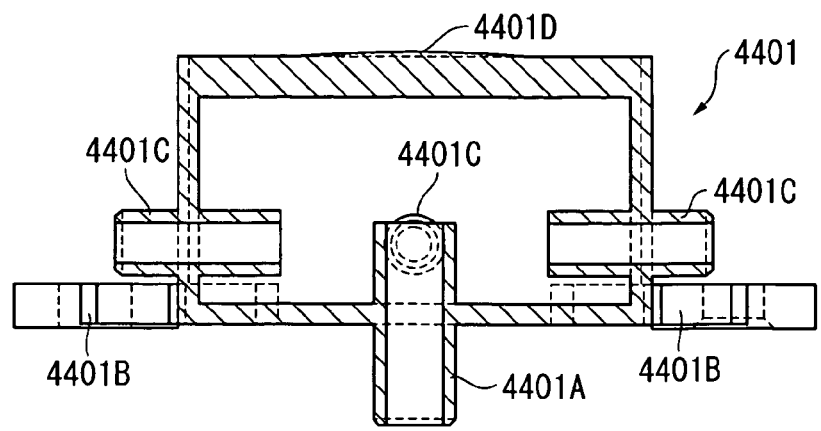
FIG. 7B is a cross-sectional view taken along the line B—B in FIG. 7A.

FIGS. 7A and 7B show a structure of a fluid branch section 4401. FIG. 7A is a plan view showing the fluid branch section 4401 when viewed from above. FIG. 7B is a cross-sectional view taken along the line B—B in FIG. 7A.

The fluid branch section 4401 is formed of an aluminum hollow member having substantially a rectangular solid shape and configured to take in the cooling fluid forcibly delivered from the fluid pressure delivery section 446 and to allow the taken-in cooling fluid to be branched into three streams toward respective optical modulator holders 4402. The fluid branch section 4401 is fixed to the bottom face of the cross dichroic prism 444, which is the end face that crosses three light beam incident side end faces, to serve as a prism fixing plate for supporting the cross dichroic prism 444.

Formed at substantially the center of the bottom face of the fluid branch section 4401 is a cooling fluid inflow section 4401A for allowing a cooling fluid delivered under pressure from the fluid pressure delivery section 446 to flow inside the fluid branch section 4401, as shown in FIG. 7B. Like the inflow section 4451 of the main tank 445, the inflow section 4401A is formed of substantially a tubular member having a pipe diameter smaller than the pipe diameter of the fluid circulation member 448 and projects inside and outside the fluid branch section 4401. One end of the fluid circulation member 448, the other end of which is connected to the fluid pressure delivery section 446 for mutual communication, is connected to one end of the inflow section 4401A that projects outside the fluid branch section 4401 to allow inflow of a cooling fluid that has been delivered under pressure from the fluid pressure delivery section 446 through the fluid circulation member 448 into the fluid branch section 4401.

Further, as shown in FIG. 7A, arm portions 4401B are formed at four corners of the bottom face of the fluid branch section 4401 in such a manner to extend along the bottom face. Each of the arm portions 4401B has a hole 4401B1 formed at the leading end thereof. A not-shown screw is inserted through the hole 4401B1 and the component housing member 451 of the optical component casing 45 and tightened, so that the optical device main body 440 is fixed to the component housing member 451 (see FIG. 12). At this time, the connection between the fluid branch section 4401 and the optical component casing 45 is made such that a heat can be transferred between them. The configuration described above ensures a heat transfer path (circulated cooling fluid—the fluid branch section 4401—the optical component casing 45), increases cooling efficiency due to the cooling fluid, leading to an increase in cooling efficiency of the liquid crystal panel 441, incident side polarization plate 442, and emission side polarization plate 443. Further, by allowing air distributed from the sirocco fan 31 to flow along the bottom face of the optical component casing 45, it is possible to increase the heat radiation area of the circulating fluid, thereby further increasing the cooling efficiency.

Cooling fluid outflow sections 4401C are formed on the three side faces of the fluid branch section 4401 corresponding to the respective light beam incident side end faces of the cross dichroic prism 444, as shown in FIG. 7A. A taken-in cooling fluid is branched into three streams and flow through the outflow sections 4401C toward respective optical modulator holders 4402.

Like the inflow section 4401A, the outflow section 4401C is formed of substantially a tubular member having a pipe diameter smaller than the pipe diameter of the fluid circulation member 448 and projects inside and outside the fluid branch section 4401. One end of the fluid circulation member 448 is connected to one end of the outflow section 4401C that projects outside the fluid branch section 4401 to allow a cooling fluid within the fluid branch section 4401 to branch and outflow through the fluid circulation member 448.

A hemispheric swelled portion 4401D is formed at substantially the center portion of the upper face of the fluid branch section 4401, as shown in FIG. 7A and FIG. 7B. By allowing the lower face of the cross dichroic prism 444 to come into contact with the swelled portion 4401D, it becomes possible to adjust the position of the cross dichroic prism 444 in the tilting direction relative to the fluid branch section 4401.

<Structure of Optical Modulator Holder>

The three optical modulator holders 4402 support the three liquid crystal panels 441, three incident side polarization plates 442, and three emission side polarization plates 443. A cooling fluid is passed through the inside of the optical modulator holders 4402 to cool the three liquid crystal panels 441, three incident side polarization plates 442, and three emission side polarization plates 443. Note that the optical modulator holders 4402 have the same configuration as each other, and only one optical modulator holder 4402 will be described hereinafter. The optical modulator holder 4402 includes, as shown in FIG. 4, an optical modulator holder main body 4404 and a support member 4405.

Figure 8:
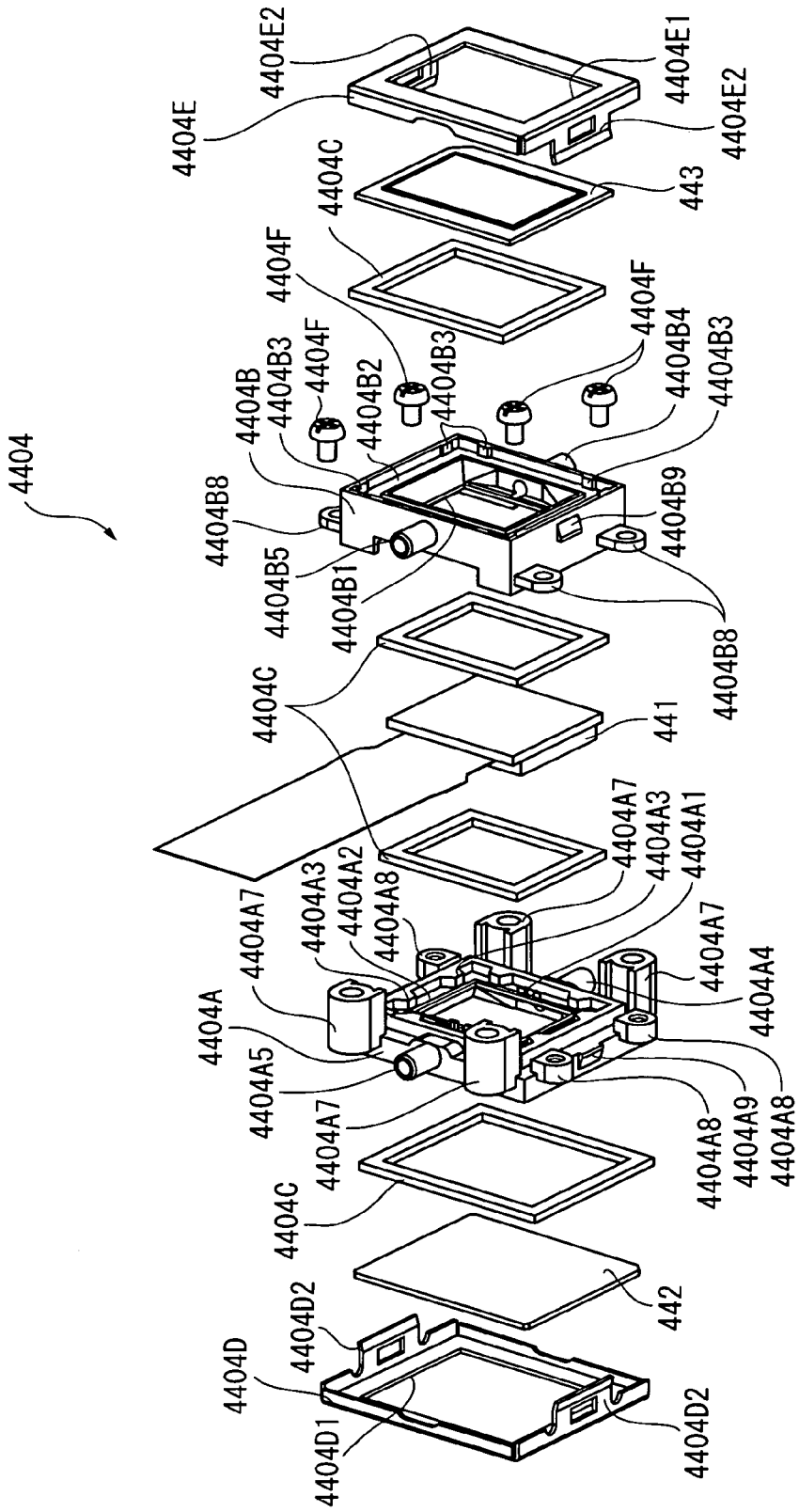
FIG. 8 is an exploded perspective view schematically showing a configuration of a main body of an optical modulator holder according to the first embodiment.

FIG. 8 is an exploded perspective view schematically showing a configuration of the optical modulator holder main body 4404.

As shown in FIG. 8, the optical modulator holder main body 4404 insides a pair of frame members 4404A and 4404B, four elastic members 4404C, and a pair of polarization plate fixing members 4404D and 4404E.

The frame member 4404A is an aluminum frame body having substantially a rectangular shape as viewed from side and has, at substantially the center portion thereof, a rectangular opening 4404A1 corresponding to the image formation area of the liquid crystal panel 441. The frame member 4404A is arranged on the light beam incident side relative to the frame member 4404B to support the light beam incident side end face of the liquid crystal panel 441 as well as the light beam emission side end face of the incident side polarization plate 442.

FIG. 9 is a perspective view showing the frame member 4404A when viewed from the light beam incident side.

A rectangular concave portion 4404A2 corresponding to the shape of the elastic member 4404C is formed on the light beam incident side end face of the frame member 4404A, as shown in FIG. 9, to support the incident side polarization plate 442 through the elastic member 4404C. In a state where the frame member 4404A supports the light beam emission side end face of the incident side polarization plate 442, the light beam incident side of the opening 4404A1 is closed by the elastic member 4404C and the light beam emission side end face of the incident side polarization plate 442. Further, a plurality of engagement projections 4404A3 are formed on the outer circumferential face of the concave portion 4404A2. The outer face of the elastic member 4404C is engaged with the engagement projections 4404A3 to position the elastic member 4404C. Thus, the elastic member 4404C is fixed to the concave portion 4404A2.

Like the light beam incident side end face, a rectangular concave portion 4404A2 corresponding to the shape of the elastic member 4404C is formed also on the light beam emission side end face of the frame member 4404A, as shown in FIG. 8, to support the light beam incident side end face of the liquid crystal panel 441 through the elastic member 4404C. In a state where the frame member 4404A supports the light beam incident side end face of the liquid crystal panel 441, the light beam emission side of the opening 4404A1 is closed by the elastic member 4404C and the light beam incident side end face of the liquid crystal panel 441. Further, a plurality of engagement projections 4404A3 are formed also on the outer circumferential face of the concave portion 4404A2.

In a state where the light beam incident side and the light beam emission side of the opening 4404A1 is closed by the liquid crystal panel 441 and the incident side polarization plate 442 as described above, a cooling chamber R1 (see FIG. 12) that can confine a cooling fluid within the frame member 4404A is formed.

An inflow port 4404A4 is formed at substantially the center of the end portion on the lower side of the frame member 4404A, as shown in FIG. 9. The cooling fluid flowing out from the outflow section 4401C of the fluid branch section 4401 flows into the frame member 4404A through the inflow port 4404A4. The inflow port 4404A4 is formed of substantially a tubular member having a pipe diameter smaller than the pipe diameter of the fluid circulation member 448 and projects outside the frame member 4404A. One end of the fluid circulation member 448, the other end of which is connected to the outflow section 4401C of the fluid branch section 4401, is connected to the projected end portion of the inflow port 4404A4 to allow a cooling fluid flowing out from the fluid branch section 4401 to flow into the cooling chamber R1 (see FIG. 12) of the frame member 4404A through the fluid circulation member 448.

An outflow port 4404A5 is formed at substantially the center of the end portion on the upper side of the frame member 4404A, as shown in FIG. 9. The cooling fluid within the cooling chamber R1 (see FIG. 12) of the frame member 4404A flows out through the outflow port 4404A5. That is, the outflow port 4404A5 is formed at the position opposed to the inflow port 4404A4. Like the inflow port 4404A4, the outflow port 4404A5 is formed of substantially a tubular member having a pipe diameter smaller than the pipe diameter of the fluid circulation member 448 and projects outside the frame member 4404A. The fluid circulation member 448 is connected to the projected end portion of the outflow port 4404A5 to allow a cooling fluid within the cooling chamber R1 (see FIG. 12) to flow out through the fluid circulation member 448.

Concave portions hollowing in the light beam emission side are formed in the vicinity of the portions communicating with the inflow port 4404A4 and the outflow port 4404A5 in the periphery of the opening 4404A1, as shown in FIG. 9. Each of the concave portions has a shape in which the width of the outside faces thereof becomes narrower toward the communication portion.

Two flow guides 4404A6 having substantially a right triangle cross-section are vertically arranged on the bottom face of the concave portion at a predetermined interval from each other such that the oblique lines thereof spread in the direction that the outside faces of the concave portions away from each other.

Four insertion sections 4404A7 are formed at the corners of the upper side end face and the lower side end face of the frame member 4404A, as shown in FIG. 9. A pin-like member (to be described later) of the support member 4405 can be inserted through each of the insertion sections 4404A7.

Connection sections 4404A8 for connection between the frame member 4404A and the frame member 4404B are formed at the corners of the left side end face and right side end face of the frame member 4404A, as shown in FIG. 9.

Hooks 4404A9 with which the polarization plate fixing member 4404D is engaged are formed at the centers of substantially the left side end face and substantially the right side end face of the frame member 4404A, as shown in FIG. 9.

The frame member 4404B, which is formed of an aluminum member, supports the liquid crystal panel 441 between itself and the above frame member 4404A through the elastic member 4404C, as well as supports the emission side polarization plate 443 with the face on the side opposite to that faces the frame member 4404A through the elastic member 4404C. The concrete structure of the frame member 4404B is substantially the same as that of the frame member 4404A. That is, the frame member 4404B has an opening 4404B1, a concave portion 4404B2, engagement projections 4404B3, an inflow port 4404B4, an outflow port 4404B5, not-shown flow guides, connection sections 4404B8, and hooks 4404B9, which corresponds to the opening 4404A1, the concave portion 4404A2, engagement projections 4404A3, the inflow port 4404A4, the outflow port 4404A5, the flow guides 4404A6, the connection sections 4404A8, and the hooks 4404A9 included in the frame member 4404A.

The fluid circulation member 448 that connects the outflow section 4401C of the fluid branch section 4401 to the inflow ports 4404A4 and 4404B4 of the frame members 4404A and 4404B has, as shown in FIG. 4, has an end branched into two. That is, a cooling fluid flowing out from the outflow section 4401C of the fluid branch section 4401 is branched into two streams toward the cooling chambers R1 and R2 (see FIG. 12) of the frame members 4404A and 4404B.

By inserting screws 4404F through the connection sections 4404A8 and 4404B8 of the frame members 4404A and 4404B and tightening them, the liquid crystal panel 441 is supported between the frame members 4404A and 4404B through the elastic members 4404C, and the faces on the side opposite to the openings 4404A1 and 4404B1 of the frame members 4404A and 4404B are sealed.

The elastic members 4404C are interposed between the incident side polarization plate 442 and the frame member 4404A, between the frame member 4404A and the liquid crystal panel 441, between the liquid crystal panel 441 and the frame member 4404B, and between the frame member 4404B and the emission side polarization plate 443. With this configuration, the cooling chambers R1 and R2 (see FIG. 12) of the frame members 4404A and 4404B are sealed, preventing leak of the cooling fluid. The elastic member 4404C is formed of a silicon rubber having elasticity, one or both faces of which is subjected to surface treatment for increasing cross-link density. For example, SARCON GR-d series (trademark registered by Fuji Polymer Industries Co., Ltd.) can be adopted as the elastic member 4404C. The above surface treatment applied to the end face makes it easy to fit the elastic members 4404C to the respective concave portions 4404A2 and 4404B2 of the frame members 4404A and 4404B.

As the elastic member 4404C, a butyl rubber, fluoric rubber, or the like having low moisture permeability can be used.

The polarization plate fixing members 4404D and 4404E press and fix the incident side polarization plate 442 and the emission side polarization plate 443 to the concave portions 4404A2 and 4404B2 of the frame members 4404A and 4404B, respectively, through the elastic members 4404C. The polarization plate fixing members 4404D and 4404E are formed of frame bodies having substantially a rectangular shape as viewed from side and have openings 4404D1 and 4404E1 at substantially the center thereof. The incident side polarization plate 442 and the emission side polarization plate 443 are pressed against the frame members 4404A and 4404B by the peripheral portions of the openings 4404D1 and 4404E1. Hook engagement sections 4404D2 and 4404E2 are formed at the right and left edges of the polarization plate fixing members 4404D and 4404E. The engagement of the hook engagement sections 4404D2 and 4404E2 with the hooks 4404A9 and 4404B9 of the frame members 4404A and 4404B allows the polarization plate fixing members 4404D and 4404E to be fixed to the frame members 4404A and 4404B in a state where the polarization plate fixing members 4404D and 4404E press the incident side polarization plate 442 and the emission side polarization plate 443.

The support member 4405 is formed of a plate having substantially a rectangular frame shape as viewed from side and has a not-shown opening at substantially the center thereof.

Pin-like members 4405A (FIG. 12) corresponding to the four insertion sections 4404A7 of the optical modulator holder main body 4404 are formed on the light beam incident side end face of the support member 4405.

The insertion of the pin-like members 4405A (see FIG. 12) into the four insertion sections 4404A7 of the optical modulator holder main body 4404 allows the support member 4405 to support the optical modulator holder main body 4404, and the adhesive fixing of the plate-like light beam emission side end face to the light beam incident end face of the cross dichroic prism 444 allows integration of the optical modulator holder 4402 and the cross dichroic prism 444.

<Structure of Intermediate Tank>

Figure 10A:
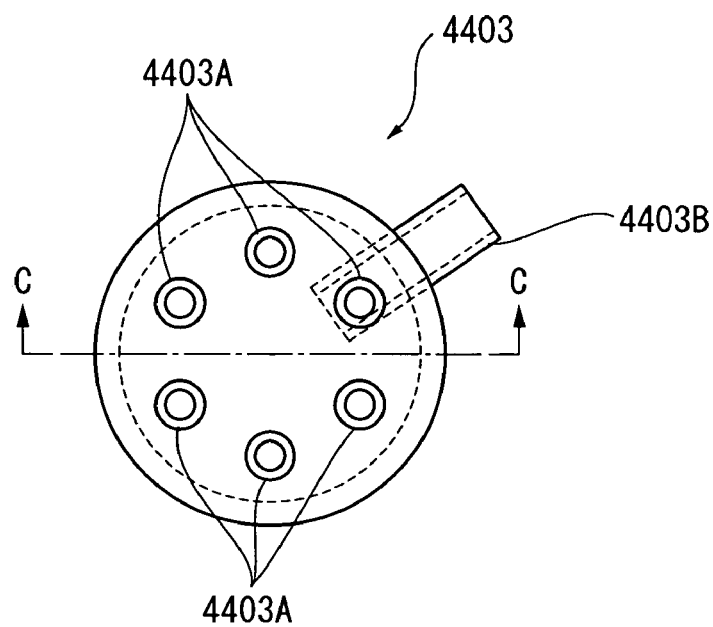
FIG. 10A is a view showing a structure of an intermediate tank according to the first embodiment.
Figure 10B:
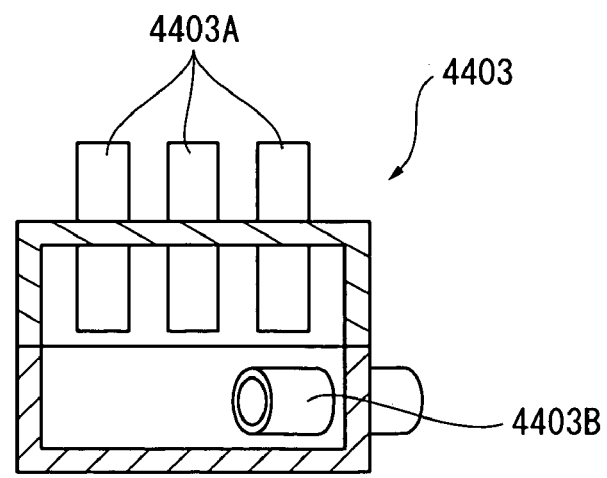
FIG. 10B is a cross-sectional view taken along the line C—C in FIG. 10A.

FIG. 10A and FIG. 10B show a structure of the intermediate tank 4403. FIG. 10A is a plan view of the intermediate tank 4403 when viewed from above. FIG. 10B is a cross-sectional view taken along the line C—C in FIG. 10A.

The intermediate tank 4403 is formed of an aluminum hollow member having substantially a cylindrical shape and is fixed to the upper face of the cross dichroic prism 444, which is the end face that crosses three light beam incident side end faces. A cooling fluid delivered from the optical modulator holders 4402 flows into the intermediate tank 4403 in block and flows outside the intermediate tank 4403.

Six cooling fluid inflow sections 4403A are formed on the upper face of the intermediate tank 4403 as shown in FIG. 10A and FIG. 10B. The cooling fluid flowing out from the frame members 4404A and 4404B of the optical modulator holder 4402 flows into the intermediate tank 4403 through the inflow sections 4403A. The inflow sections 4403A are formed of substantially a tubular member having a pipe diameter smaller than the pipe diameter of the fluid circulation member 448 and project inside and outside the intermediate tank 4403. One ends of the fluid circulation member 448, the other ends of which are connected to the outflow ports 4404A5 and 4404B5 of the frame member 4404A and 4404B of the three optical modulator holders 4402, are connected to the end portions of the inflow sections 4403A that project outside to allow a cooling fluid flowing out from the optical modulator holders 4402 to flow into the intermediate tank 4403 in block through the fluid circulation member 448.

A cooling fluid outflow section 4403B is formed on the lower side of the outside face of the intermediate tank 4403 as shown in FIG. 10A and FIG. 10B. A cooling fluid flowing in the intermediate tank 4403 flows outside through the outflow section 4403B. Like the inflow sections 4403A, the outflow section 4403B is formed of substantially a tubular member having a pipe diameter smaller than the pipe diameter of the fluid circulation member 448 and project inside and outside the intermediate tank 4403. One end of the fluid circulation member 448 is connected to the end portion of the outflow section 4403B that projects outside to allow a cooling fluid within the intermediate tank 4403 to flow outside through the fluid circulation member 448.

<Structure of Radiator>

Figure 11A:
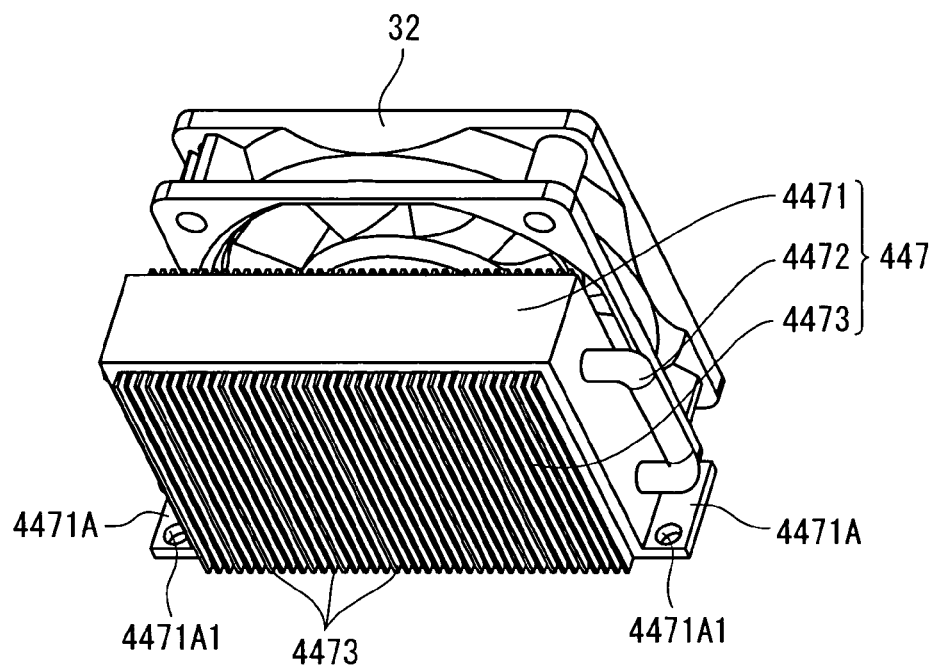
FIG. 11A is a view showing a structure of a radiator and an arrangement relationship between the radiator and an axial fan according to the first embodiment.
Figure 11B:
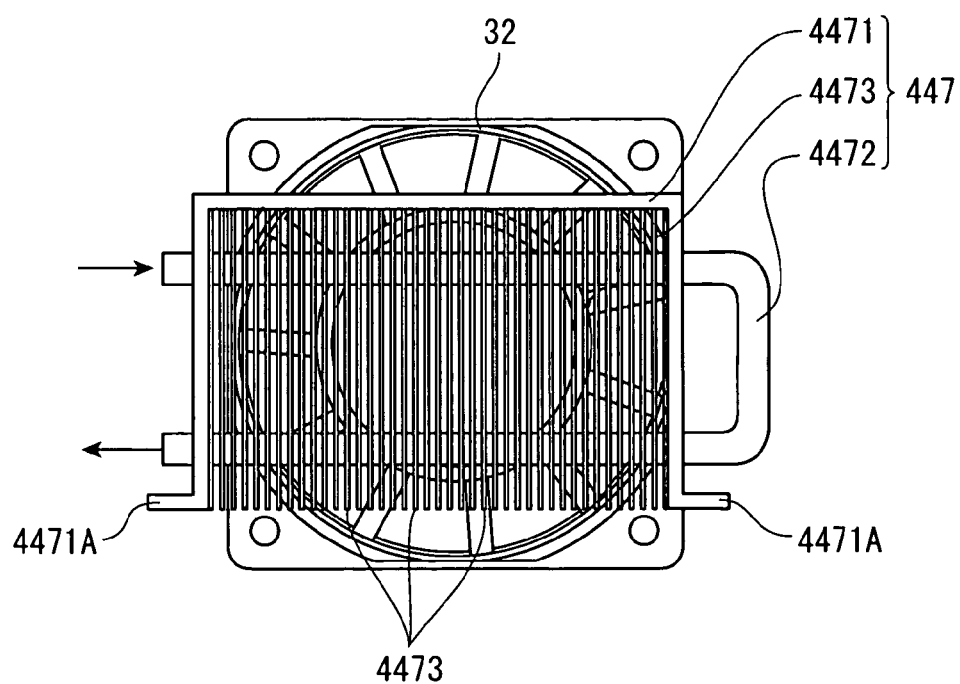
FIG. 11B is a plan view showing the radiator and axial fan when viewed from the radiator side.

FIG. 11A and FIG. 11B show a structure of the radiator 447 and an arrangement relationship between the radiator 447 and the axial fan 32. More specifically, FIG. 11A is a perspective view showing a structure of the radiator 447 and the axial fan 32 when viewed from above. FIG. 11B is a plan view showing the radiator 447 and the axial fan 32 when viewed from the radiator 447 side.

The radiator 447, which is arranged within the partition 21 formed inside the outer case 2 as shown in FIG. 1 or FIG. 2, radiates heat of the cooling fluid warmed in the optical device main body 440 by the liquid crystal panels 441, the incident side polarization plates 442, and the emission side polarization plates 443. The radiator 447 includes, as shown in FIG. 11A and FIG. 11B, a fixing section 4471, a tubular member 4472, and a plurality of fins 4473.

The fixing section 4471 is formed of a heat transfer member such as metal, and has substantially a U-like shape as viewed from the radiator, as shown in FIG. 11B. The tubular member 4472 can be inserted through the two sides of the U-shape that face each other. The fixing section 4471 supports the plurality of heat radiation fins 4473 between the inside faces of the U-shape. Extending portions 4471A that extend outside are formed at the leading end portions of the U-shape of the fixing section 4471. By inserting not-shown screws through holes 4471A1 of the extending portions 4471A and the outer case 2 and tightening them, the radiator 447 is fixed to the outer case 2.

The tubular member 4472 is made of aluminum and has substantially a U-like shape as viewed from the radiator side as shown in FIG. 11B. More specifically, the tubular member 4472 extends from a first leading end edge on a first side of the U-like shape fixing section 4471 toward a second leading end edge on a second side of the U-like shape. The leading end in the extending direction is bent at substantially right angles to extend downwardly, and the leading end in the extending direction is further bent at substantially right angles to extend from a third leading end edge on the second side of the U-like shape fixing section 4471 toward a fourth leading end edge on the first side of the U-like shape. The connection between the tubular member 4472, the fixing section 4471, and the heat radiation fins 4473 is made such that a heat can be transferred between them. The tubular member 4472 has a pipe diameter smaller than the pipe diameter of the fluid circulation member 448. One end of the tubular member 4472 on the upper side in FIG. 11B is connected to one end of the fluid circulation member 448, the other end of which is connected to the outflow section 4403B of the intermediate tank 4403 in the optical device main body 440. Further, the other end of the tubular member 4472 on the lower side in FIG. 11B is connected to one end of the fluid circulation member 448, the other end of which is connected to the inflow section 4451 of the main tank 445. That is, a cooling fluid flowing out from the intermediate tank 4403 is passed through the fluid circulation member 448 to the tubular member 4472, and the cooling fluid passed through the tubular member 4472 flows in the main tank 445 through the fluid circulation member 448.

The heat radiation fins 4473 are constituted by plates made of a heat transfer member such as metal. The tubular member 4472 can be inserted through the heat radiation fins 4473. The heat radiation fins 4473 extend in a direction perpendicular to the insertion direction of the tubular member 4472, and are arranged in parallel to each other in the insertion direction of the tubular member 4472. In the arrangement state of the plurality of heat radiation fins 4473, a cooling air discharged from the axial fan 32 is passed through spaces between the plurality of heat radiation fins 4473, as shown in FIG. 11A, and FIG. 11B.

As described above, a cooling fluid is circulated in the flow path (the main tank 445—the fluid pressure delivery section 446—the fluid branch section 4401—the optical modulator holders 4402—the intermediate tank 4403—the radiator 447—the main tank 445) through the fluid circulation members 448.

<Cooling Structure>

A cooling structure of the liquid crystal panel 441, the incident side polarization plate 442, and the emission side polarization plate 443 will next be described below.

Figure 12:
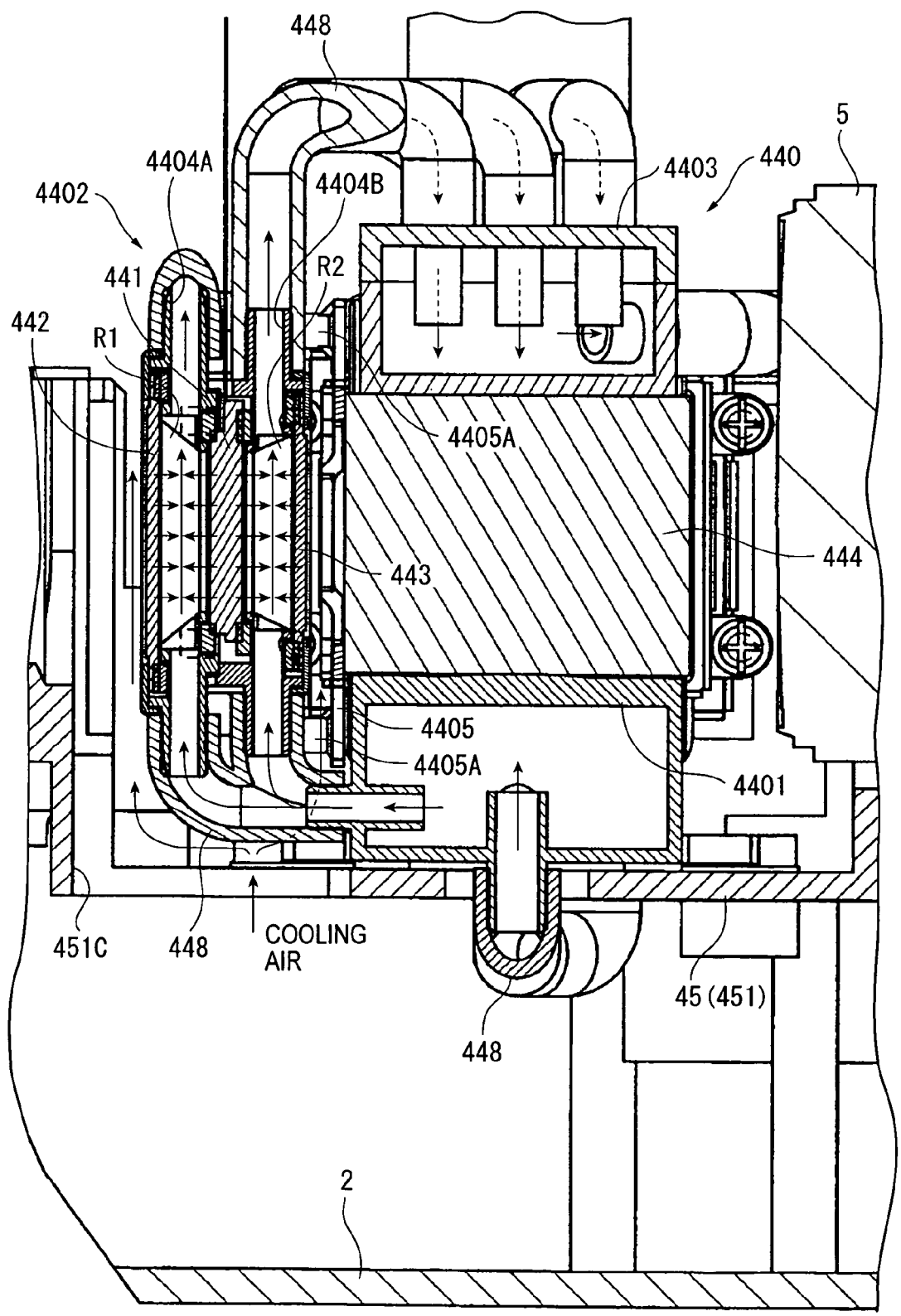
FIG. 12 is a cross-sectional view for explaining a cooling structure of a liquid crystal panel, a light incident side polarization plate, and a light emission side polarization plate according to the first embodiment.

FIG. 12 is a cross-sectional view for explaining a cooling structure of the liquid crystal panel 441, the incident side polarization plate 442, and the emission side polarization plate 443.

The heat generated in the liquid crystal panel 441, the incident side polarization plate 442, and the emission side polarization plate 443 by the light beam emitted from the light source 411 is transferred to the cooling fluid in the cooling chambers R1 and R2 of the frame members 4404A and 4404B of the optical modulator holder 4402.

The heat transferred to the cooling fluid within the cooling chambers R1 and R2 moves with the flow of the cooling fluid from the cooling chambers R1 and R2 through the intermediate tank 4403 to the radiator 447. While the heated cooling fluid is passed through the tubular member 4472 of the radiator 447, the heat of the cooling fluid is transferred to the heat radiation fins 4473 through the tubular member 4472. There, the heat transferred to the heat radiation fins 4473 is cooled by a cooling air discharged from the axial fan 32.

The cooling fluid cooled by the radiator 447 then moves from the radiator 447 to the fluid branch section 4401 through the main tank 445 and the fluid pressure delivery section 446, and finally reaches again to the cooling chambers R1 and R2.

The cooling air introduced from the outside of the projector 1 into the inside thereof by the sirocco fan 31 of the cooling unit 3 is introduced into the optical component casing 45 through the holes 451C formed on the bottom face of the optical component casing 45. The cooling air thus introduced into the optical component casing 45 flows along the outside face of the optical modulator holder main body 4404 and flows in between the optical modulator holder main body 4404 and the support member 4405, and is distributed from downward to upward, as shown in FIG. 12. At this time, the cooling air thus being distributed cools the light beam incident side end face of the incident side polarization plate 442 and the light beam emission side end face of the emission side polarization plate 443.

In the first embodiment described above, the attachment of the replenishment tank 449 to the main tank 445 makes it easy to replenish the main tank 445 with a new cooling fluid through the outlet section 4491 of the replenishment tank 449 and the inlet section 4454 of the main tank 445. Therefore, even if the volume of the cooling fluid to be circulated in the optical device 44 is reduced, the user of the product himself or herself can attach the replenishment tank 449 to the main tank 445 or replace the replenishment tank 449 with a new one. This eliminates the need of requesting the manufacturer to perform the replenishment of the cooling fluid, doing away with extra burden to be imposed on the user or manufacturer. Further, even if the user performs the replenishment of the cooling fluid in the optical device 44, the configuration according to the embodiment prevents the cooling fluid from leaking into the projector 1. This eliminates the risk such as dirt, corrosion, or occurrence of electrical short in the projector 1 due to the leak of the cooling fluid, thereby increasing reliability.

Before attachment of the replenishment tank 449 to the main tank 445, the inlet hole 4454A of the main tank 445 is closed by the inlet valve 4454B and the outlet hole 4491A is closed by the outlet valve 4491B. Therefore, the cooling fluid in the main tank 445 is not exposed to the outside air through the inlet hole 4454A. Further, the cooling fluid for replenishment in the replenishment tank 449 is not exposed to the outside air through the outlet hole 4491A. As a result, it is possible to prevent dust or the like from being mixed into the cooling fluid. This prevents the dust or the like mixed into the cooling fluid from intercepting the light beam to be passed through the cooling chambers R1 and R2, so that image quality of the optical image formed in the optical device main body 440 can be maintained in good condition.

When the replenishment tank 449 has been attached to the main tank 445, the valve guide section 4491C of the replenishment tank 449 moves the inlet valve 4454B to open the inlet hole 4454A. Further, at the time when the replenishment tank 449 is removed from the main tank 445, the coil spring 4454D biases the inlet valve 4454B to close the inlet hole 4454A. Therefore, the cooling fluid in the main tank 445 does not leak into the outside through the inlet hole 4454A even while the replenishment tank 449 is replaced with a new one. This further eliminates the risk such as dirt, corrosion, or occurrence of electrical short in the projector 1 due to the leak of the cooling fluid. Further, the cooling fluid in the main tank 445 is not exposed to the outside air through the inlet hole 4454A, so that image quality of the optical image formed in the optical device main body 440 can further be maintained in good condition.

Further, the sealed chamber 4491A1 and the distribution chamber 4491A2 are formed in the outlet hole 4491A. This configuration simplifies an opening and closing structure of the outlet hole 4491A, making it easy to manufacture the replenishment tank 449.

Further, one-touch operation can attach the replenishment tank 449 to the main tank 445. Thus, the user can easily perform the replenishment of the cooling fluid in the optical device 44 by him/herself.

In the main tank 445, each of the inflow section 4451 and the outflow section 4452 has one end projecting toward the inside of the main tank 445. Thus, it is possible to allow only the cooling fluid accumulated in the main tank 445 to flow out to the outside of the main tank 445. For example, when the main tank 445 is not completely filled with the cooling fluid, it is possible to prevent air from being mixed into the cooling fluid in the main tank 445 and allow only the cooling fluid to flow out to the outside of the main tank 445. Since not only the outflow section 4452 but also the inflow section 4451 projects inside, it is possible to allow the accumulated cooling fluid to flow out through the inflow section 4451 to the outside even in the case where the distribution direction of the cooling fluid is changed, that is, even when the cooling fluid is allowed to flow out through the inflow section 4451 to the outside and the cooling fluid is allowed to flow in through the outflow section 4452. The same can be said of the fluid branch section 4401 and intermediate tank 4403.

The inwardly-projected ends of the inflow section 4451 and the outflow section 4452 cross each other at substantially right angles when viewed from above. This configuration prevents the cooling fluid flowing in the main tank 445 through the inflow section 4451 from directly flowing out to the outside through the outflow section 4452. As a result, it is possible to mix the flow-in cooling fluid with the cooling fluid in the main tank 445 to equalize the temperature of the cooling fluid.

Further, the optical device 44 includes the fluid branch section 4401, the optical modulator holder 4402, the intermediate tank 4403, the main tank 445, the replenishment tank 449, the fluid pressure delivery section 446, the radiator 447, and the plurality of fluid circulation members 448. Thus, by encapsulating the cooling fluid in not only the cooling chambers R1 and R2 of the optical modulator holders 4402 but also in the intermediate tank 4403, the main tank 445, the replenishment tank 449, the fluid pressure delivery section 446, the tubular member 4472 of the radiator 447, and the plurality of fluid circulation members 448, the volume of the cooling fluid can be increased, thereby increasing heat exchange rate between the liquid crystal panel 441 and the cooling fluid. Further, the fluid pressure delivery section 446 forcibly circulates the cooling fluid through the plurality of fluid circulation members 448 in the flow path (the main tank 445—the fluid pressure delivery section 446—the fluid branch section 4401—the optical modulator holders 4402—the intermediate tank 4403—the radiator 447—the main tank 445). This configuration prevents the cooling fluid from being warmed by the liquid crystal panel 441. As a result, the temperature difference between the liquid crystal 441 and the cooling fluid is not reduced.

The cooling chambers R1 and R2 are formed by closing the light beam incident side and light beam emission side of the openings 4404A1 and 4404B1 with the liquid crystal panel 441, the incident side polarization plate 442, and the emission side polarization plate 443. Therefore, the heat generated in the incident side polarization plate 442, and the emission side polarization plate 443 can be radiated to the cooling fluid distributed in the cooling chambers R1 and R2, thereby effectively cooling the incident side polarization plate 442, and the emission side polarization plate 443.

Further, the plurality of fluid circulation members 448, the main tank 445, the fluid pressure delivery section 446, the fluid branch section 4401, the pair of frame members 4404A and 4404B, the intermediate tank 4403, and the tubular member 4472 are formed of corrosion-resisting aluminum.

This prevents chemical reactions from occurring even in the case of the above components are in contact with the cooling fluid in a long period of time. That is, it is possible to avoid coloration or the like of the cooling fluid due to an active substance generated by the chemical reactions, preventing the optical characteristics of the light beam passed through the cooling chambers R1 and R2 from being changed.

The projector 1 can effectively cools the liquid crystal panel 441, the incident side polarization plate 442, and the emission side polarization plate 443 using the cooling fluid as well as includes the optical device 44 in which the replenishment of the cooling fluid can easily be performed, so that the life of the projector 1 can be prolonged and maintainability of the projector 1 can be improved.

The opening 23 is formed on the upper case 2A of the outer case 2, and the cap member 24 is engaged with the opening 23. Thus, when the cooling fluid to be circulated in the optical device 44 needs to be replenished, simply removing the cap member 24 allows the replenishment tank 449 to be removed and inserted from/into the projector through the opening 23, so that it is possible to easily attach/detach the replenishment tank 449 to/from the main tank 445.

[Second Embodiment]

A second embodiment of the present invention will next be described with reference to the accompanying drawings.

In the following description, the same reference numerals as those in the first embodiment denote the same structures and components as those in the first embodiment, and the detailed descriptions thereof are omitted or simplified.

In the first embodiment, the outlet valve 4491B of the replenishment tank 449 is moved by the valve guide section 4454C of the main tank 445 to open the outlet hole 4491A in the closed state. The replenishment tank 449 has no mechanism to allow the position of the outlet valve 4491B to be set back to the position at which the outlet hole 4491A is in a closed state from the open position of the outlet hole 4491A.

On the other hand, in the second embodiment, a replenishment tank 549 has a mechanism to allow the position of an outlet valve 5491B to be set back to the position at which a cooling fluid outlet hole 5491A is in a closed state from the open position of the outlet hole 5491A. It is assumed that the configurations of the components other than a main tank 545 and the replenishment tank 549 are the same as those in the first embodiment.

Figure 13A:
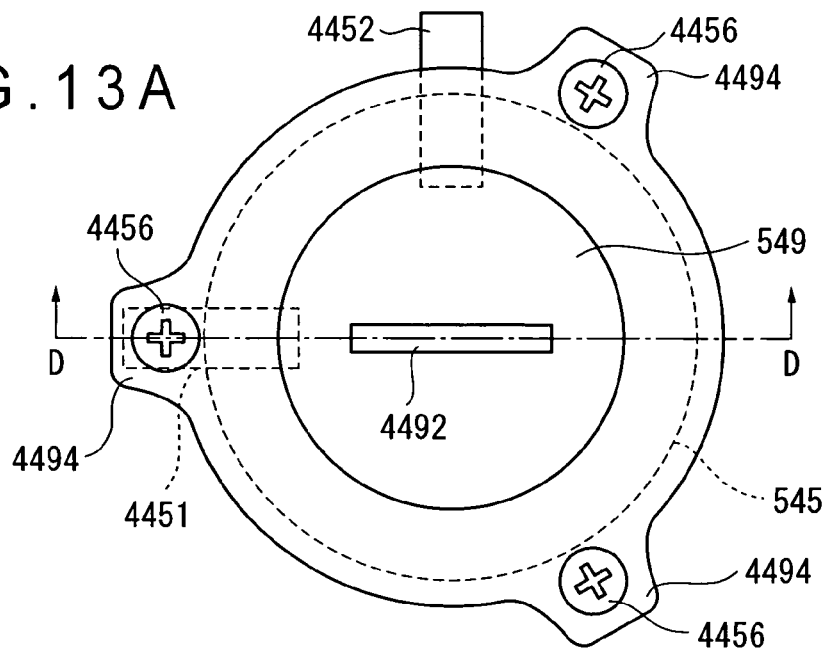
FIG. 13A is a plan view showing a structure of a main tank and a replenishment tank according to a second embodiment.
Figure 13B:
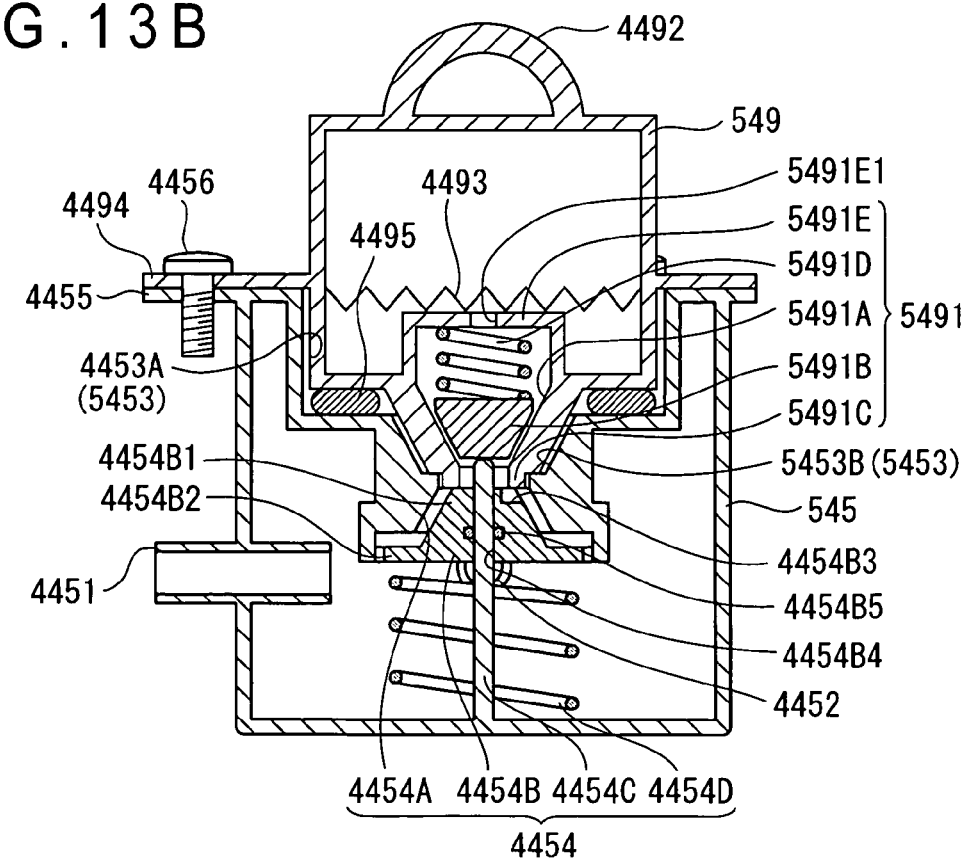
FIG. 13B is a cross-sectional view taken along the line D—D in FIG. 13A.

FIG. 13A and FIG. 13B show a structure of the main tank 545 and the replenishment tank 549 according to the second embodiment. More specifically, FIG. 13A is a plan view showing the main tank 545 and the replenishment tank 549 when viewed from above. FIG. 13B is a cross-sectional view taken along the line D—D in FIG. 13A.

The main tank 545 serving as a cooling fluid accumulation section has substantially the same shape as that of the main tank 445 described in the first embodiment except only for the shape of a component corresponding to the concave portion 4453 of the first embodiment. That is, the main tank 545 includes, as shown in FIG. 13A and FIG. 13B, the inflow section 4451, the outflow section 4452, the inlet section 4454, and the fixing section 4455 (all of the above are the same as those in the first embodiment) as well as a concave portion 5453.

The concave portion 5453 includes the concave portion 4453A described in the first embodiment as well as substantially a cylindrical concave portion 5453B having the same axis as that of the concave portion 4453A at substantially the center portion of the bottom face of the concave portion 4453A.

The upper side of the inner face of the concave portion 5453B has a tapered face corresponding to the shape of the outside face of the leading end of a cooling fluid outlet section 5491 (to be described later) of the replenishment tank 549 as shown in FIG. 13B. The sectional area of the tapered face is gradually reduced toward the lower side.

The lower side of the inner face of the concave portion 5453B has a tapered face corresponding to the shape of the outside face of the cylindrical shape of the inlet valve 4454B of the inlet section 4454 as shown in FIG. 13B. The tapered face can be in contact with a chamfered portion of the cylindrical member 4454B1 of the inlet valve 4454B, and the cylindrical member 4454B2 is freely fitted to the lower side of the concave portion 5453B. It is the portion that serves as the inlet hole 4454A.

The replenishment tank 549 serving as a cooling fluid replenishment section has substantially the same shape as that of the replenishment tank 449 described in the first embodiment, and includes the handle 4492, the filter 4493, and the fixing section 4494 (all of the above are the same as those in the first embodiment) as well as the cooling fluid outlet section 5491. The outlet section 5491 is positioned at substantially the center portion of the bottom face of the replenishment tank 549, and has substantially a cone-like shape that protrudes downward as shown in FIG. 13B. At the time when the replenishment tank 549 is attached to the main tank 545, the replenishment tank 549 is inserted into the upper side of the concave portion 5453 of the main tank 545. The outlet section 5491 is constituted by, as shown in FIG. 13B, an outlet hole 5491A, an outlet valve 5491B, a valve guide section 5491C, a coil spring 5491D serving as an outlet valve biasing unit, and a coil spring support section 5491E.

The outlet hole 5491A, which penetrates through the outlet section 5491 to connect the inside of the replenishment tank 449 to the outside thereof, can delivers an internal cooling fluid to the outside. As shown in FIG. 13, the inside face of the outlet hole 5491A is formed to correspond to the outer shape of the outlet section 5491 and has a tapered face to be in contact with the outside face of the outlet valve 5491B. The outlet valve 5491B and a coil spring 5491D are arranged in the outlet hole 5491A.

The outlet valve 5491B has a tapered face corresponding to the shape of the inside face of the outlet hole 5491A. When the tapered face comes in contact with the inside face of the outlet hole 5491A, the outlet hole 5491A is closed. When being pressed by the valve guide section 4454C of the main tank 545, the outlet valve 5491B is moved in a direction away from the tapered face of the outlet hole 5491A, to open the outlet hole 5491A.

The valve guide section 5491C is so formed as to protrude from the leading end of the outlet section 5491. Like the valve guide section 4491C of the first embodiment, when the replenishment tank 549 is attached to the main tank 545, the valve guide section 5491C comes in contact with the upper face of the inlet valve 4454B of the main tank 545 to move the inlet valve 4454B in a direction (downward direction in FIG. 13B) to open the inlet hole 4454A of the main tank 545.

The coil spring support section 5491E protrudes from the bottom face to the inside of the replenishment tank 549, and is vertically arranged in such a manner to surround the outlet valve 5491B and the coil spring 5491D arranged in the outlet hole 5491A. One end of the coil spring 5491D is brought into contact with the upper end face of the coil spring support section 5491E by pressurizing. A communication hole 5491E1 that connects the inside of the replenishment tank 549 and the outlet hole 5491A is formed on the upper end face of the coil spring support section 5491E.

The coil spring 5491D has one end brought into contact with the coil spring support section 5491E by pressurizing, and the other end brought into contact with the upper face of the outlet valve 5491B to bias the outlet valve 5491B in such a direction that the outlet hole 5491A is closed by the outlet valve 5491B. That is, in a state that the replenishment tank 549 has not been attached to the main tank 545, the coil spring 5491D biases the outlet valve 5491B to close the outlet hole 5491A.

In attaching the replenishment tank 549 to the main tank 545, after the O-ring 4495 has been set in the bottom face of the concave portion 4453A of the main tank 545, the valve guide section 4454C is firstly inserted through the outlet hole 5491A of the replenishment tank 549 to allow the leading end of the valve guide section 4454C to come in contact with the bottom face of the outlet valve 5491B of the replenishment tank 549. The replenishment tank 549 is then further pressed against the main tank 545 to press the outlet valve 5491B in the valve guide section 4454C, so that the outlet valve 5491B is moved upward as shown in FIG. 13B against the biasing force of the coil spring D, with the result that the outlet hole 5491A of the replenishment tank 549 is opened. At this time, the valve guide section 5491C of the replenishment tank 549 comes in contact with the upper face of the inlet valve 4454B of the main tank 545 and presses down the inlet valve 4454B to open the inlet hole 4454A of the main tank 545. When the outlet hole 5491A and the inlet hole 4454A are thus opened, the main tank 545 is replenished with a cooling fluid in the replenishment tank 549 through the outlet hole 5491A, the cut 4454B3 of the inlet valve 4454B, and the inlet hole 4454A. Like the first embodiment, the screw 4456 is inserted through each of the fixing sections 4494 of the replenishment tank 549 and the fixing sections 4455 of the main tank 545 and the bottom face of the outer case 2 and tightened, with the result that the replenishment tank 549 and the main tank 545 are tightly attached to each other and, at the same time, the replenishment tank 549 and the main tank 545 are fixed to the outer case 2.

The method of exchanging the replenishment tank 549 is substantially the same as that of the replenishment tank 449, which has been described in the first embodiment, and the description thereof is omitted.

In the second embodiment described above, in a state where the replenishment tank 549 has been attached to the main tank 545, the valve guide section 4454C of the main tank 545 moves the outlet valve 5491B to open the outlet hole 5491A; on the other hand, in a state where the replenishment tank 549 has been removed from the main tank 545, the coil spring 5491D biases the outlet valve 5491B to close the outlet hole 5491A. Therefore, at the time when the replenishment tank 549 is removed from the main tank 545 for exchange, the cooling fluid remaining in the replenishment tank 549 does not leak to the outside through the outlet hole 5491A. This further eliminates the risk such as dirt, corrosion, or occurrence of electrical short in the projector 1 due to the leak of the cooling fluid, thereby further increasing reliability.

[Third Embodiment]

A third embodiment of the present invention will next be described with reference to the accompanying drawings.

In the following description, the same reference numerals as those in the first embodiment denote the same structures and components as those in the first embodiment, and the detailed descriptions thereof are omitted or simplified.

In the first embodiment described above, the replenishment tank 449 is attached to the main tank 445 when the main tank 445 needs to be replenished with a cooling fluid.

On the other hand, in the third embodiment, a cooling fluid inlet section 6454 is formed so that a main tank 645 can be replenished with a cooling fluid, which eliminates the need for the replenishment tank 449. It is assumed that the configurations of the components other than the main tank 645 are the same as those in the first embodiment.

Figure 14:
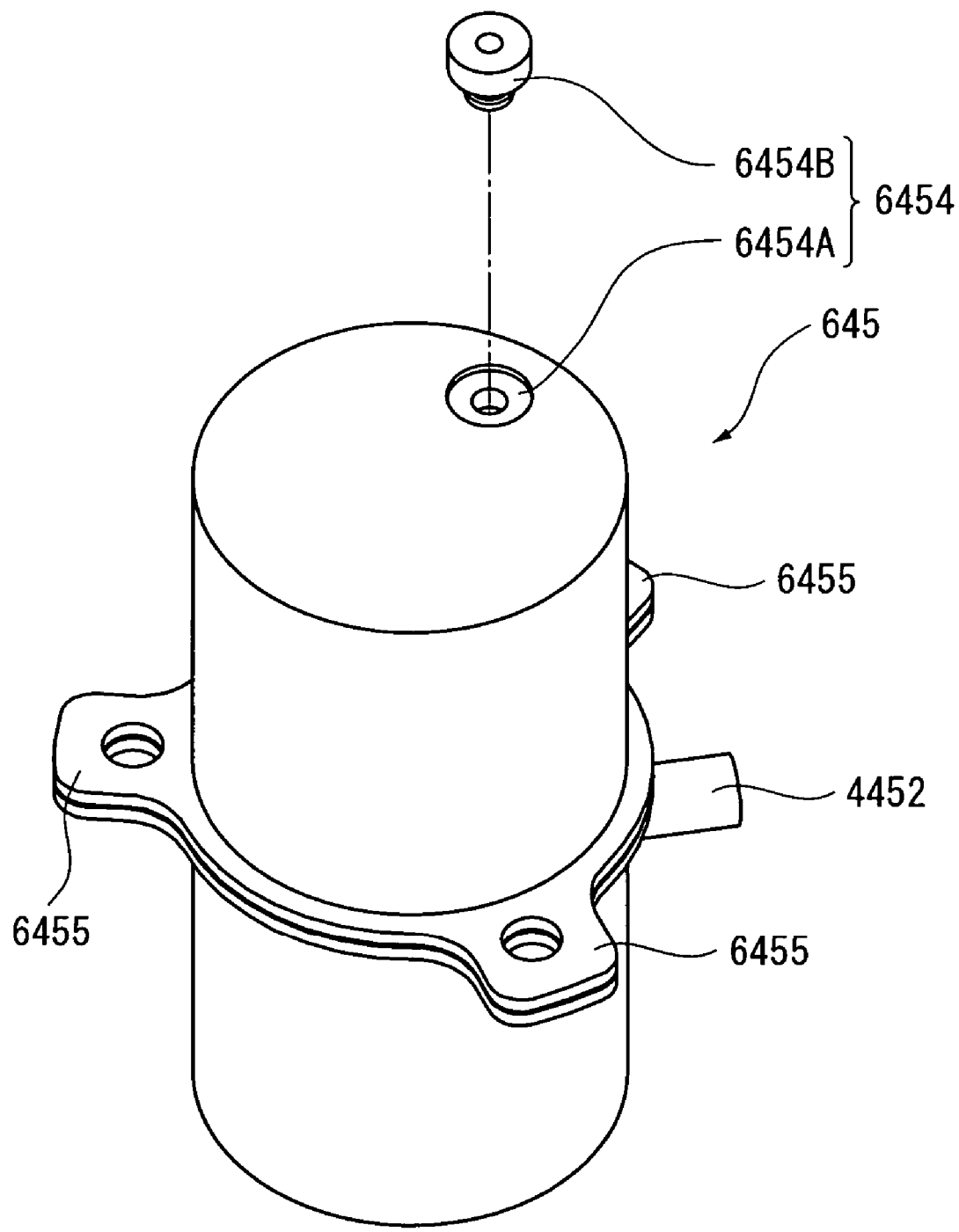
FIG. 14 is a perspective view showing a structure of a main tank according to a third embodiment.

FIG. 14 is a perspective view showing a structure of the main tank 645 according to the third embodiment.

The main tank 645 serving as a cooling fluid accumulation section has substantially a cylindrical shape and is constituted by two aluminum vessel-like members. The two vessel-like members are connected to each other with the openings thereof facing each other, and a cooling fluid is temporarily accumulated inside the main tank thus obtained. The vessel-like members are connected to each other by seal-welding or through an elastic member such as a rubber.

The not-shown cooling fluid inflow section and the outflow section 4452, which are the same as those included in the main tank 445 of the first embodiment, are formed at substantially the center portion of the main tank 645 in a cylindrical axis direction thereof, as shown in FIG. 14.

Further, three fixing sections 6455 are formed, for each vessel-like member, on the outer peripheral face of the main tank 645 at substantially the center portion in a cylindrical axis direction thereof, as shown in FIG. 14. A not-shown screw is inserted through each of the fixing sections 6455 and the bottom face of the outer case 2, and tightened to connect the two vessel-like members to each other and fix the main tank 645 to the outer case 2.

Formed on the upper face of the main tank 645 is the inlet section 6454 as shown in FIG. 14, through which the main tank 645 can be replenished with a cooling fluid.

Figure 15:
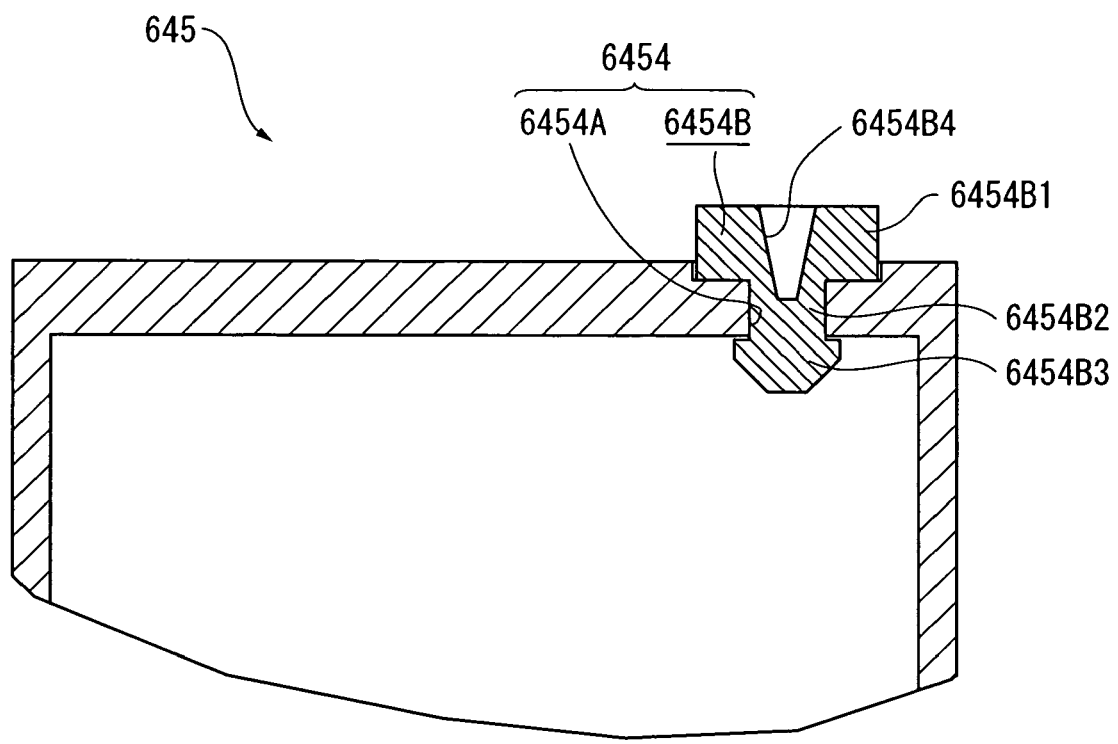
FIG. 15 is a cross-sectional view showing a structure of a cooling fluid inlet section according to the third embodiment.

FIG. 15 is a cross-sectional view showing a structure of the inlet section 6454.

The inlet section 6454 is constituted by, as shown in FIG. 14 or FIG. 15, a cooling fluid inlet hole 6454A and an elastic member 6454B.

The inlet hole 6454A is a circular spot facing penetrating the main tank 645, as shown in FIG. 14 or FIG. 15.

The elastic member 6454B is a sealing plug that engages with the inlet hole 6454A to prevent the inner cooling fluid from leaking through the inlet hole 6454A. The elastic member 6454B has a shape corresponding to the shape of the inlet hole 6454A, in which two cylindrical members 6454B1 and 6454B2 having a common axis are integrated with each other and has substantially a T-like cross-section as shown in FIG. 15.

Of the two cylindrical members, the cylindrical member 6454B2 has substantially a hemispheric swelled portion 6454B3 integrally formed at the leading end thereof. The swelled portion 6454B3 has a diameter larger than the diameter of the cylindrical member 6454B2.

In attaching the elastic member 6454B to the inlet hole 6454A, the swelled portion 6454B3 is screwed into the inlet hole 6454A to be positioned inside of the main tank 645. As a result, the side wall of the inlet hole 6454A is held between the swelled portion 6454B3 and the cylindrical member 6454B1, allowing the elastic member 6454B to be engaged with the inlet hole 6454A.

A concave portion 6454B4 having substantially a cone-like shape extends from substantially the center portion of the upper face of the cylindrical member 6454B1 to the cylindrical member 6454B2.

For example, a butylene-based rubber material can be adopted as the elastic member 6454B.

The main tank 645 is replenished with a cooling fluid as follows.

Firstly, a cooling fluid for replenishment is previously encapsulated in a not-shown injector. After that, the cap member 24 engaged with the opening 23 of the outer case 2 is removed, and a needle of the injector is inserted through the opening 23. Under the condition that the elastic member 6454B is attached to the inlet hole 6454A of the main tank 645, the needle of the injector is inserted through the bottom face of the concave portion 6454B4 of the elastic member 6454B and into the inside of the main tank 645. In this state, the cooling fluid in the injector is supplied to the main tank 645. After the replenishment, the needle of the injector is pulled out of the elastic member 6454B. At this time, the hole in the elastic member 6454B that has been made by the needle is closed by the elastic force of the elastic member 6454B.

The third embodiment described above is more advantageous than the first embodiment in that the replenishment of the cooling fluid can be completed only with the injector or the like without the replenishment tank 449, thereby reducing the cost involved in the replenishment of the cooling fluid.

Since the structure of the main tank 645 is thus simplified, it is possible to easily manufacture the main tank 645 and, at the same time, to reduce the manufacturing cost of the main tank 645, leading to a reduction in the manufacturing cost of the optical device 44 and the projector 1.

The replenishment of the cooling fluid can be completed simply by inserting, for example, a needle of the injector or the like through the elastic member 6454B. Further, the hole in the elastic member 6454B that has been made by the needle is closed by the elastic force of the elastic member 6454B itself after the needle is pulled out of the elastic member 6454B. That is, it is possible to easily complete the replenishment of the cooling fluid without any operation directly to the main tank 645. Further, since the hole in the elastic member 6454B that has been made by the needle is closed by the elastic force of the elastic member 6454B itself after the needle is pulled out of the elastic member 6454B, the cooling fluid in the main tank 645 does not leak to the outside through the hole after the completion of the replenishment of the cooling fluid. This further eliminates the risk such as dirt, corrosion, or occurrence of electrical short in the projector 1 due to the leak of the cooling fluid. Further, it is possible to prevent dust or the like from being mixed into the cooling fluid in the main tank 645.

In particular, in the case where the projector 1 is suspended from the ceiling, it is possible to replenish the cooling fluid with the main tank 645 simply by removing the cap member 24 without the need of removing the projector 1 from the ceiling, which remarkably increases maintainability of the projector 1.

[Fourth Embodiment]

A fourth embodiment of the present invention will next be described with reference to the accompanying drawings.

In the following description, the same reference numerals as those in the first and third embodiments denote the same structures and components as those in the first and third embodiments, and the detailed descriptions thereof are omitted or simplified.

In the first embodiment described above, the replenishment tank 449 is attached to the main tank 445 when the main tank 445 needs to be replenished with a cooling fluid.

On the other hand, in the fourth embodiment, a cooling fluid inlet section 7454 is formed so that a main tank 745 can be replenished with a cooling fluid, which eliminates the need for the replenishment tank 449. It is assumed that the configurations of the components other than the main tank 745 are the same as those in the first embodiment.

Figure 16:
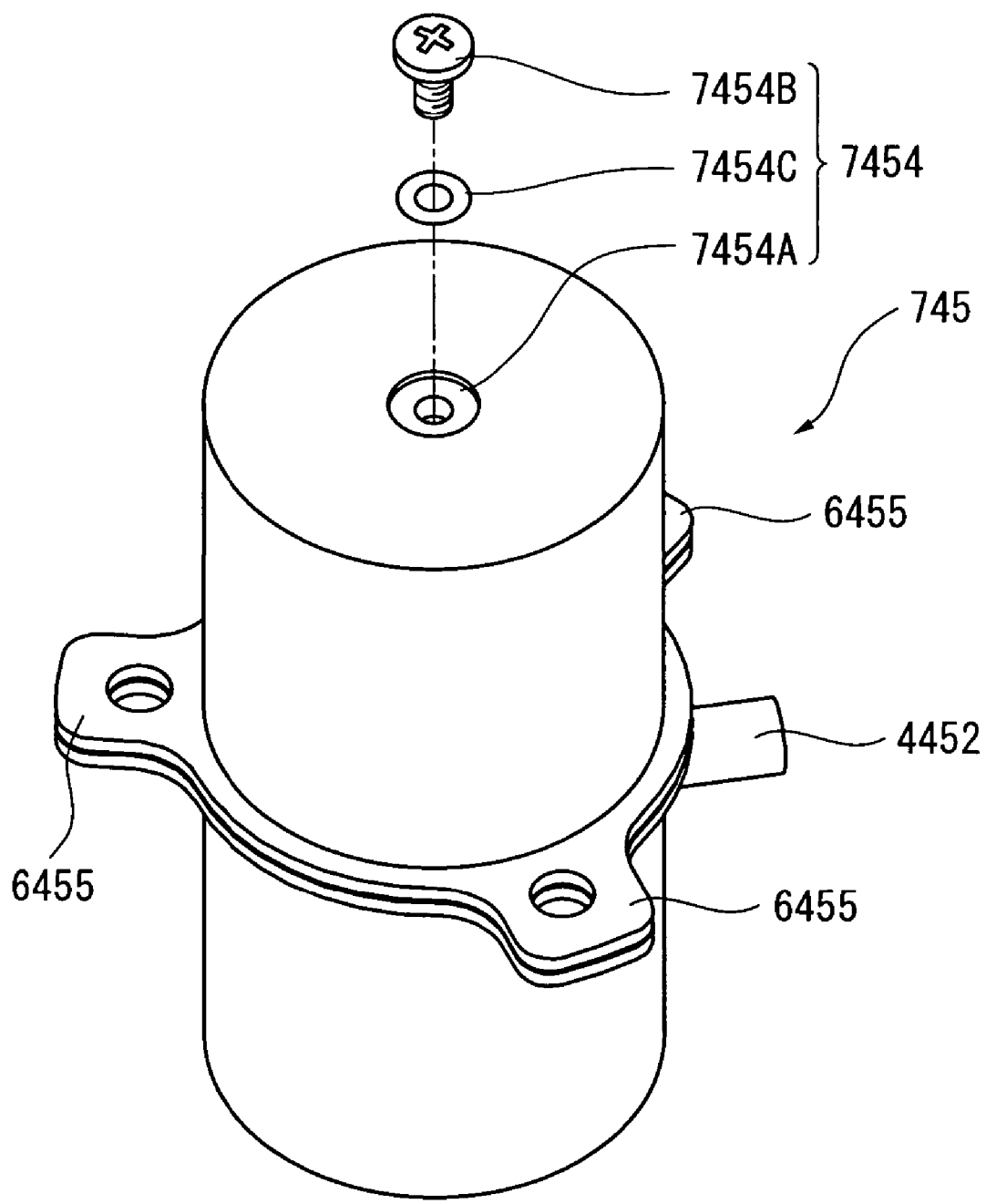
FIG. 16 is a perspective view showing a structure of a main tank according to a fourth embodiment.

FIG. 16 is a perspective view showing a structure of the main tank 745 according to the fourth embodiment.

The main tank 745 serving as a cooling fluid accumulation section has substantially a cylindrical shape and is constituted by two aluminum vessel-like members, like the main tank 645 described in the third embodiment. The main tank 745 includes, as shown in FIG. 16, the not-shown cooling fluid inflow section and the outflow section 4452, and the three fixing sections 6455, all of which are the same as those included in the main tank 645 of the third embodiment, as well as the inlet section 7454.

Figure 17:
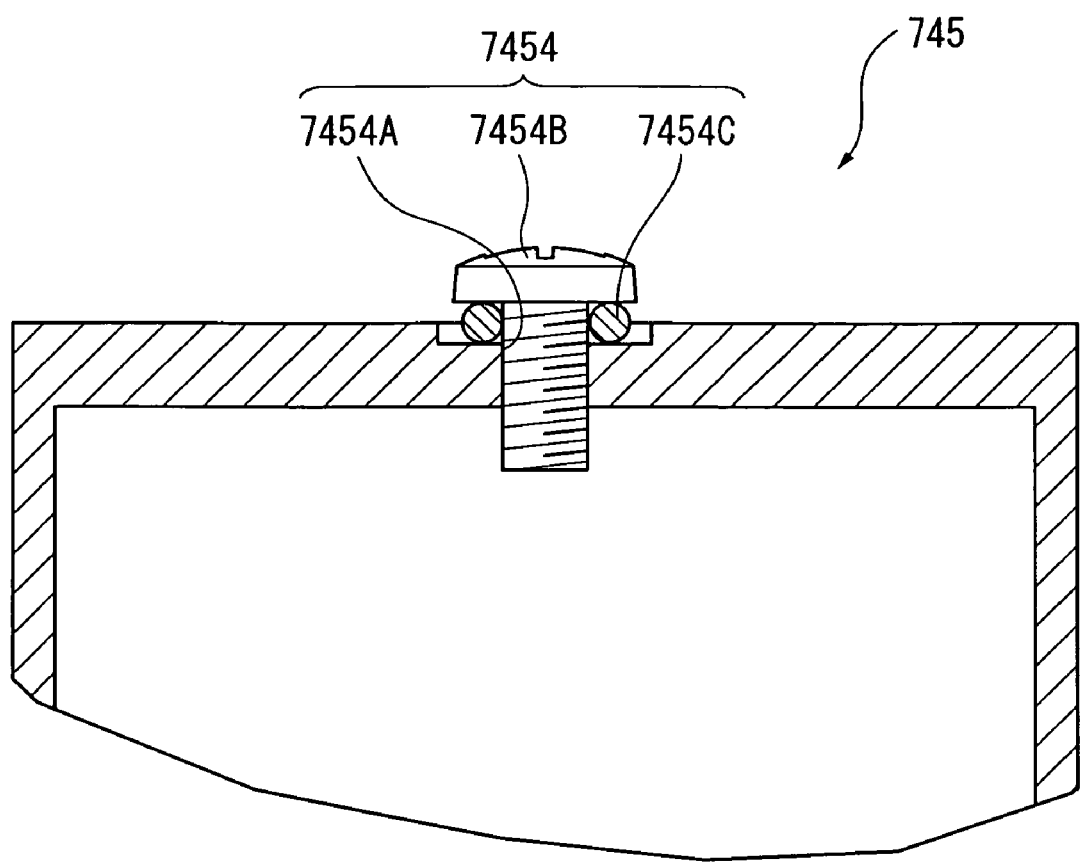
FIG. 17 is a cross-sectional view showing a structure of a cooling fluid inlet section according to the fourth embodiment.

FIG. 17 is a cross-sectional view showing a structure of the inlet section 7454.

The inlet section 7454 is formed on the upper face of the main tank 745 so that the main tank 745 can be replenished with a cooling fluid. The inlet section 7454 is constituted by, as shown in FIG. 16 or FIG. 17, a cooling fluid inlet hole 7454A, a screw member 7454B, and a packing 7454C.

The inlet hole 7454A is a circular spot facing penetrating the main tank 745, as shown in FIG. 16 or FIG. 17. A not-shown female thread groove to be engaged with the screw member 7454B is formed in the inner periphery of the inlet hole 7454A.

The screw member 7454B is a sealing screw that is engaged with the inlet hole 7454A to prevent the inner cooling fluid from leaking through the inlet hole 7454A.

The packing 7454C is formed of, for example, a rubber member having elasticity and is interposed between the head portion of the screw member 7454B and the inlet hole 7454A to prevent the cooling fluid from leaking through the gap between the screw member 7454B and the inlet hole 7454A.

The main tank 745 is replenished with a cooling fluid as follows.

Firstly, a cooling fluid for replenishment is previously encapsulated in a not-shown injector. After that, the cap member 24 engaged with the opening 23 of the outer case 2 is removed, and a driver or the like is inserted through the opening 23. The screw member 7454B that is engaged with the inlet hole 7454A of the main tank 745 is then removed using the driver. Thereafter, a needle of the injector is inserted through the opening 23. The needle of the injector is then inserted through the inlet hole 7454A into the inside of the main tank 745. In this state, the cooling fluid in the injector is supplied to the main tank 745. After the replenishment, the screw member 7454B is engaged with the inlet hole 7454A through the packing 7454C to close the inlet hole 7454A.

The fourth embodiment described above is more advantageous than the first embodiment in that the replenishment of the cooling fluid can be completed only with the injector or the like without the replenishment tank 449, thereby reducing the cost involved in the replenishment of the cooling fluid.

Since the structure of the main tank 745 is thus simplified, it is possible to easily manufacture the main tank 745 and, at the same time, to reduce the manufacturing cost of the main tank 745, leading to a reduction in the manufacturing cost of the optical device 44 and the projector 1.

Further, simply removing the screw member 7454B from the inlet hole 7454A can complete the replenishment of the cooling fluid, making it easy to replenish the main tank 745 with the cooling fluid.

[Fifth Embodiment]

A fifth embodiment of the present invention will next be described with reference to the accompanying drawings.

In the following description, the same reference numerals as those in the first and third embodiments denote the same structures and components as those in the first and third embodiments, and the detailed descriptions thereof are omitted or simplified.

The main tanks 445, 545, 645, and 745 according to the first to fourth embodiments described above have no mechanism for allowing a user to visually confirm the volume of the inner cooling fluid.

On the other hand, a main tank 845 according to the fifth embodiment has a fluid volume display section 8451 for allowing a user to visually confirm the volume of the inner cooling fluid. It is assumed that the configurations of the components other than the main tank 845 are the same as those in the first embodiment.

Figure 18:
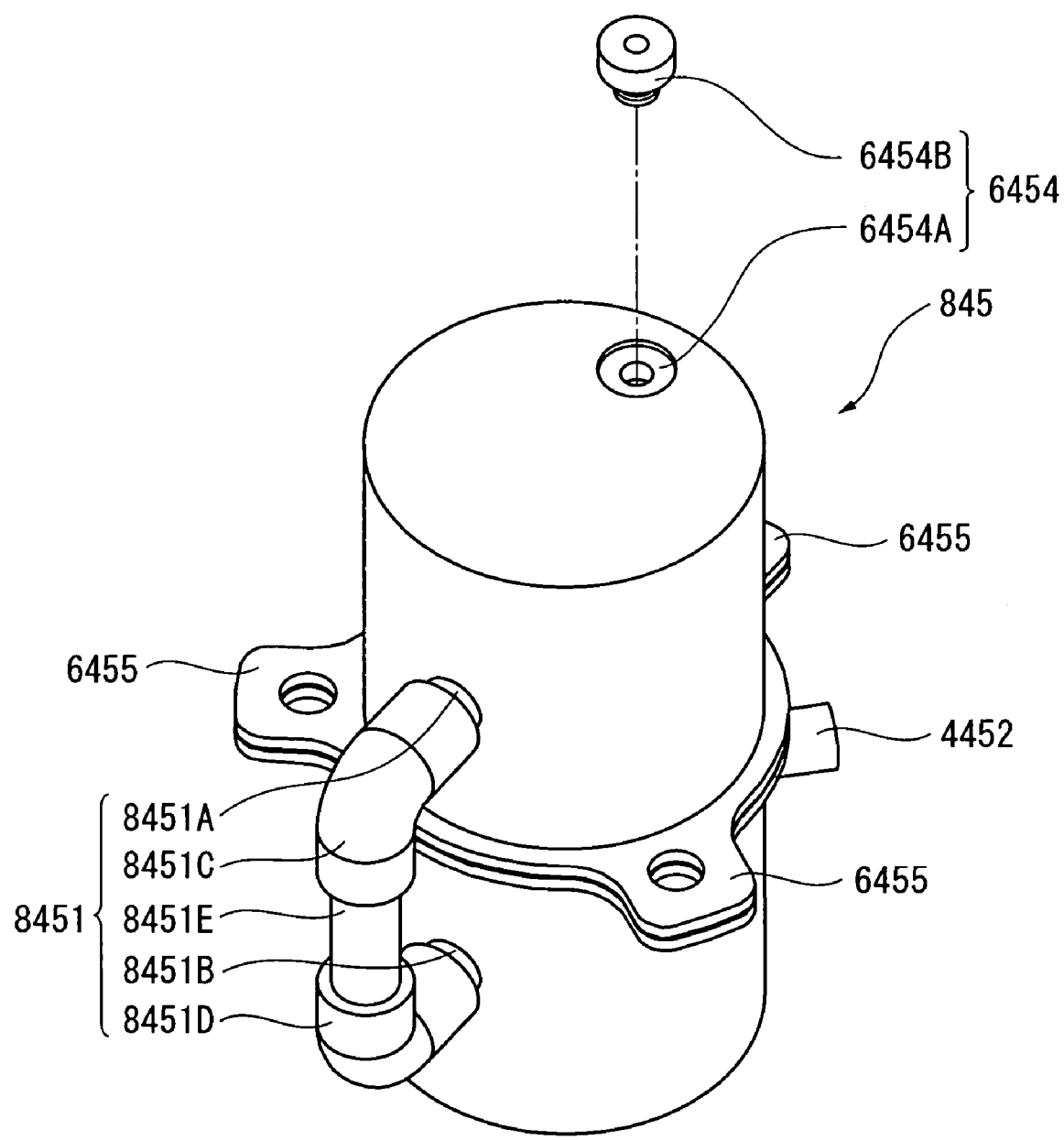
FIG. 18 is a perspective view showing a structure of a main tank according to a fifth embodiment.

FIG. 18 is a perspective view showing a structure of the main tank 845 according to the fifth embodiment.

In the present embodiment, the above-mentioned display section 8451 is applied to the main tank 645 of the third embodiment. That is, the main tank 845 serving as a cooling fluid accumulation section has substantially a cylindrical shape and is constituted by two aluminum vessel-like members. The main tank 845 includes the not-shown cooling fluid inflow section and the outflow section 4452, the inlet section 6454 (including the cooling fluid inlet hole 6454A and the elastic member 6454B) and the three fixing sections 6455, all of which are the same as those included in the main tank 645, as well as the display section 8451.

Figure 19:
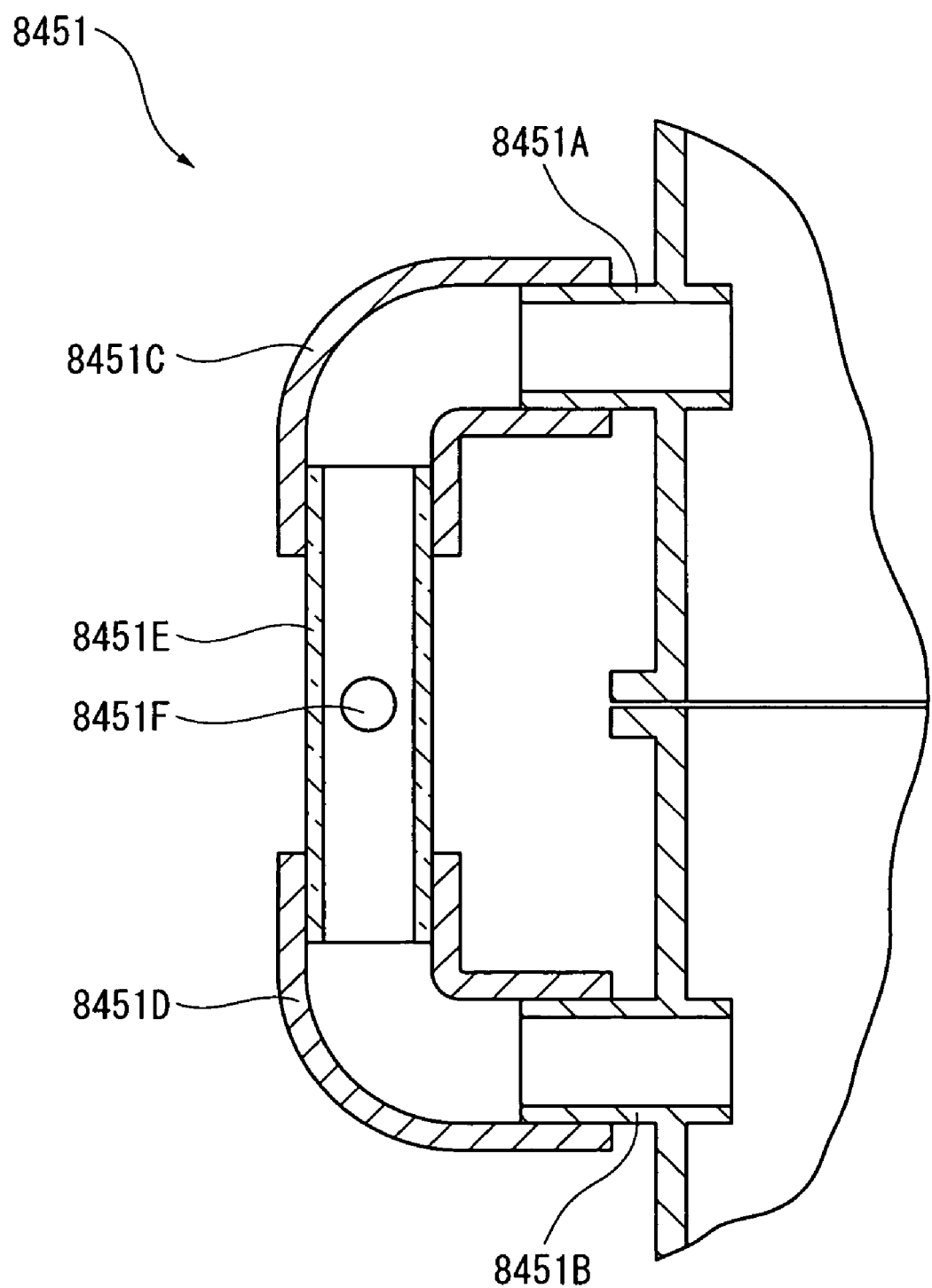
FIG. 19 is a cross-sectional view showing a structure of a fluid volume display section according to the fifth embodiment.

FIG. 19 is a cross-sectional view showing a structure of the display section 8451.

The display section 8451 is constituted by, as shown in FIG. 19, a pair of cooling fluid distribution sections 8451A and 8451B, a pair of tubular members 8451C and 8451D, a transparent member 8451E, and floating member 8451F.

The pair of distribution sections 8451A and 8451B is a section that allows a cooling fluid within the main tank 845 to be distributed in the display section 8451. Each of the distribution sections 8451A and 8451B has substantially a tubular shape having a pipe diameter smaller than the pipe diameter of each of the pair of tubular members 8451C and 8451D and projects inside and outside the main tank 845, as shown in FIG. 18 or FIG. 19. The distribution sections 8451A and 8451B are arranged in parallel with each other at the upper and lower portions of the main tank 845.

Each of the pair of tubular members 8451C and 8451D has substantially L-like shape as viewed from side as shown in FIG. 18 or FIG. 19. One ends of tubular members 8451C and 8451D are connected to the outwardly-projected ends of the distribution sections 8451A and 8451B, and the other ends thereof face each other.

The transparent member 8451E is formed of a tubular member such as glass that allows the user to visually confirm the inside of the main tank 845 and is connected to the ends of the pair of tubular members 8451C and 8451D.

The inside of the main tank 845 and that of the display section 8451 communicate with each other through the distribution sections 8451A and 8451B, the tubular members 8451C and 8451D, and the transparent member 8451E described above in such a manner that the cooling fluid can be distributed between them, maintaining substantially the same fluid level between the inside of the main tank 845 and that of the display section 8451.

The floating member 8451F is a member having substantially a sphere-like shape and is floated on the surface of the cooling fluid in the transparent member 8451E. That is, simply by confirming the height of the floating member 8451F in the transparent member 8451E through the transparent member 8451E, the volume of the cooling fluid within the main tank 845 can be visually confirmed.

The method of replenishing the main tank 845 with the cooling fluid is substantially the same as in the case of the third embodiment, and the description thereof is omitted.

Although not specifically shown, a catch portion that prevents the floating member 8451F from entering the main tank 845 from the display section 8451 is formed at least in any of the pair of distribution sections 8451A and 8451B and the pair of tubular members 8451C and 8451D, or the transparent member 8451E.

Further, although not specifically shown, the outer case 2 has an opening at a portion (for example, the side face of the outer case 2) corresponding to the display section 8451 of the main tank 845, and the transparent member such as glass is engaged with the opening. Thus, it is possible to visually confirm the display section 8451 from the outside of the projector 1 through the transparent member.

In the fifth embodiment described above, the display section 8451 of the main tank 845 includes the pair of distribution sections 8451A and 8451B, the pair of tubular members 8451C and 8451D, the transparent member 8451E, and the floating member 8451F. The user can recognize the volume of the cooling fluid within the main tank 845 simply by confirming the position of the floating member 8451F. Therefore, the user can easily determinate the replenishment timing of the cooling fluid and thereby can use the projector 1 free of worry.

Further, the outer case 2 has an opening at a portion (for example, the side face of the outer case 2) corresponding to the display section 8451, and the transparent member such as glass is engaged with the opening. As a result, the user can confirm the position of the floating member 8451F from the outside of the projector 1 through the transparent member without the need of taking the outer case 2 apart, increasing the level of convenience.

While the preferred embodiments of the present invention have thus been shown and described, the present invention is not limited to the above-described embodiments, and various modification and design change can be made without departing from the spirit and scope of the invention.

In the above embodiments, the optical device 44 includes the fluid pressure delivery section 446 that forcibly circulates a cooling fluid. Alternatively, however, the fluid pressure delivery section 446 can be omitted. That is, a cooling fluid can be circulated by natural convection.

The configuration of the optical modulator holder 4402 is not limited to that described in the above embodiments.

For example, in the above embodiments, the cooling chambers R1 and R2 are formed in the optical modulator holder 4402 both on the light beam incident side and the light beam emission side of the liquid crystal panel 441. Alternatively, however, the cooling chamber can be formed only on one of the light beam incident side and the light beam emission side.

Further, in the above embodiments, the incident side polarization plate 442 and the emission side polarization plate 443 are arranged respectively on the light beam incident side and the light beam emission side of the pair of frame members 4404A and 4404B constituting the optical modulator holder 4402. Alternatively, however, a translucent substrate such as a glass substrate can be arranged respectively on the light beam incident side and the light beam emission side of the pair of frame members 4404A and 4404B to seal one end faces of the openings 4404A1 and 4404B1.

In the above first and second embodiments, the replenishment tank 449 or 549 is attached to the main tank 445 or 545 from above. Alternatively, however, the replenishment tank can be attached to the main tank from any direction such as from below or side.

Similarly, while the inlet section 6454 or 7454 is formed on the upper face of the main tank 645, 745 or 845 in the above third to fifth embodiments, the inlet section can be formed at any position such as on the lower face or side face of the main tank.

In the above first and second embodiments, the coil spring 4454D and 5491D are adopted respectively as the inlet valve biasing unit and the outlet valve biasing unit. Alternatively, however, other biasing members such as a flat spring or elastic members having elasticity such as rubber can be used as the inlet valve biasing unit and the outlet valve biasing unit.

While the butylene-based rubber material is adopted as the elastic member 6454B in the above third and fifth embodiments, any material can be used as the elastic member 6454B as far as it has elasticity.

In the fifth embodiment, the display section 8451 is applied to the main tank 645 of the third embodiment. Alternatively, however, the display section 8451 can be applied to the main tank 445 of the first embodiment, the main tank 545 of the second embodiment, and the main tank 745 of the fourth embodiment.

Further, the configuration of the display section 8451 is not limited to that described in the fifth embodiment. For example, a configuration in which a transparent member such as glass is attached to an opening, which has been formed, for example, at a part of the side wall of the main tank 445, 545, 645 or 745 can be adopted to allow the user to visually confirm the volume of the cooling fluid within the main tank 445, 545, 645 or 745 through the transparent member. Further, for example, the entire side wall of the main tank 445, 545, 645 or 745 can be formed of a transparent member such as glass.

In the above embodiments, the main tank 445, the fluid branch section 4401, and the intermediate tank 4403 include the inflow sections 4451, 4401A, 4403A, and the outflow sections 4452, 4401C, 4403B, respectively, and one end portions of all the above components inwardly project. Alternatively, however, a configuration in which the fluid circulation members 448 are directly connected for mutual communication to the main tank 445, the fluid branch section 4401, and the intermediate tank 4403 to allow one end portions of the fluid circulation members 448 to project inside the main tank 445, the fluid branch section 4401, and the intermediate tank 4403 can be adopted.

While the members to be contact with a cooling fluid: the fluid circulation member 448, the main tank 445, the fluid pressure delivery section 446, the tubular member 4472 of the radiator 447, the frame members 4404A, 4404B, and the intermediate tank 4403 are formed of aluminum members in the above embodiments, the material of the above members is not limited to this, but can be formed of other materials as far as they have corrosion resistance. For example, oxygen-free copper or duralumin can be used as the material. As the fluid circulation member 448, a low hardness butyl rubber or fluoric rubber having low deformation reaction force acting on the optical modulator holder 4402 and thereby suppressing pixel misalignment can be used.

In the above embodiments, the volumes of the cooling fluid to flow in the optical modulator holders 4402 are set to substantially the same value. Alternatively, however, the volumes of the cooling fluid can be different for each optical modulator holder 4402.

For example, a configuration in which a valve is formed in the flow path between the fluid branch section 4401 and each optical modulator holder 4402, and the position of the valve is changed to narrow or broaden the flow path can be adopted.

Further, for example, the fluid circulation members 448 having different pipe diameters can be used to connect the fluid branch section 4401 and each optical modulator holder 4402.

In the above embodiments, the outside face of the optical modulator holder 4402 and the bottom face of the optical component casing 45 are cooled by the air distributed from the sirocco fan 31. Alternatively, however, the sirocco fan 31 can be omitted. The omission of the sirocco fan 31 contributes to a reduction in noise.

In the above embodiments, the optical unit 4 has substantially an L-like shape as viewed from above. Alternatively, however, the optical unit 4 having substantially a U-like shape as viewed from above can be used.

In the above embodiments, the projector 1 uses the three liquid crystal panels. Alternatively, however, a projector using only one liquid crystal panel, a projector using two liquid crystal panels, or a projector using four or more liquid crystal panels can be used.

In the above embodiments, the transparent liquid crystal panel having different surface between the light incident side and the light emission side is used. Alternatively, however, a reflective liquid crystal panel having the same surface between the light incident side and the light emission side can be used.

In the above embodiments, the liquid crystal panel is used as an optical modulator. Alternatively, however, optical modulators other than the liquid crystal panel, such as a device using a micro-mirror can be used. In this case, the polarization plates on the light beam incident side and the light beam emission side can be omitted.

In the above embodiments, the front-type projector projects an image in a direction for observing a screen. Alternatively, however, a rear-type projector that projects an image in a direction opposite to the direction for observing the screen can be used.

In the above embodiments, the configuration of the main tank 445, 545, 645, 745, or 845 and that of the replenishment tank 449 or 549 are applied to the projector 1. Alternatively, however, the configurations of the main tank and the replenishment tank can be applied to the liquid cooling system in the electronic apparatus other than the projector 1, such as a personal computer.

The present invention is not limited to the above-described preferred embodiments. That is, while the present invention has been illustrated and described mainly with respect to specified embodiments, various modifications and changes can be made to the shape, material, numerical quantity, and other detailed configurations in the above embodiments by those skilled in the art without departing from the spirit and scope of the present invention.

Therefore, the descriptions disclosed in the above that limit the shape, material, and the like are examples for making the present invention easier to understand and do not limit the present invention. Accordingly, descriptions made with names of the components in which a part of or all of the limitations such as the shape, material and the like have been released can be regarded as the present invention.

The priority application Number JP2004-033584 upon which this patent application is based is hereby incorporated by reference.

What is claimed is:

1. An optical device including an optical modulator that modulates a light beam emitted from a light source in accordance with image information to form an optical image, comprising:
an optical modulator holder that has inside thereof a cooling chamber in which a cooling fluid is encapsulated and holds the optical modulator in such a manner that heat can be transferred to the cooling fluid in the cooling chamber;
a plurality of fluid circulation members that are connected to the cooling chamber of the optical modulator holder for mutual communication to guide the cooling fluid outside the cooling chamber and guide the cooling fluid inside the cooling chamber again; and
a cooling fluid accumulation section that is arranged in a flow path of the cooling fluid in the plurality of fluid circulation members and accumulates the cooling fluid, the accumulation section having a cooling fluid inlet section for allowing the accumulation section to be replenished with the cooling fluid.

2. The optical device according to claim 1, comprising
a cooling fluid replenishment section that accumulates a cooling fluid for replenishment and can be attached/detached to or from the accumulation section,
the replenishment section having a cooling fluid outlet section for allowing the cooling fluid for replenishment to be delivered outside, and replenishing the accumulation section with the cooling fluid for replenishment through the outlet section and the inlet section when having been attached to the accumulation section.

3. The optical device according to claim 2, wherein
the inlet section includes a cooling fluid inlet hole through which the accumulation section can be replenished with the cooling fluid, and an inlet valve that closes the inlet hole,
the outlet section includes a cooling fluid outlet hole through which the cooling fluid can be delivered outside the accumulation section, and an outlet valve that closes the outlet hole, and
the accumulation section and the replenishment section have valve guide sections respectively that move the outlet valve and the inlet valve in such a direction to open the inlet hole and the outlet hole in a state where the accumulation section and the replenishment section are attached to each other.

4. The optical device according to claim 3, wherein the inlet section includes an inlet valve biasing unit for biasing the inlet valve in such a direction to close the inlet hole.

5. The optical device according to claim 3, wherein
the outlet hole has: a sealed chamber in which the outlet valve is firmly attached thereto, the sealed chamber allowing the cooling fluid for replenishment to be encapsulated inside thereof by the outlet valve; and a distribution chamber in which the outlet valve is freely fitted thereto, the distribution chamber allowing the cooling fluid for replenishment to be distributed outside through a gap between the distribution chamber and the outlet valve, and the valve guide section of the accumulation section moves the outlet valve from the sealed chamber to the distribution chamber in a state where the accumulation section and the replenishment section are attached to each other.

6. The optical device according to claim 3, wherein the outlet section includes an outlet valve biasing unit for biasing the outlet valve in such a direction to close the outlet hole.

7. The optical device according to claim 1, wherein the inlet section includes the cooling fluid inlet hole for allowing the accumulation section to be replenished with the cooling fluid, and an elastic member that is engaged with the inlet hole to close the same.

8. The optical device according to claim 1, wherein the inlet section includes the cooling fluid inlet hole for allowing the accumulation section to be replenished with the cooling fluid, and a screw member that is screwed into the inlet hole to close the same.

9. The optical device according to claim 1, wherein the accumulation section includes a fluid volume display section that can display the volume of the inner cooling fluid.

10. The optical device according to claim 1, wherein
the accumulation section includes a cooling fluid inflow section that is connected to the plurality of fluid circulation members to allow the cooling fluid to flow in the accumulation section, and a cooling fluid outflow section that is connected to the fluid circulation members to allow the cooling fluid to flow outside the accumulation section, and
each of the inflow section and the outflow section has a tubular shape that can distribute the cooling fluid, and has one end that projects inside of the accumulation section.

11. The optical device according to claim 10, wherein the inflow section and the outflow section are formed and arranged in such a manner that the inflow and outflow directions of the cooling fluid cross with each other substantially at right angles in plan view.

12. A projector comprising: a light source; an optical device including an optical modulator that modulates a light beam emitted from the light source in accordance with image information to form an optical image; a projection optical device that projects the optical image formed in the optical device in an enlarged manner; and an outer case that houses therein the light source, the optical device, and the projection optical device at predetermined positions, respectively,
wherein the optical device includes: an optical modulator holder that has inside thereof a cooling chamber in which a cooling fluid is encapsulated and holds the optical modulator in such a manner that heat can be transferred to the cooling fluid in the cooling chamber; a plurality of fluid circulation members that are connected to the cooling chamber of the optical modulator holder for mutual communication to guide the cooling fluid outside the cooling chamber and guide the cooling fluid inside the cooling chamber again; and a cooling fluid accumulation section that is arranged in a flow path of the cooling fluid in the plurality of fluid circulation members and accumulates the cooling fluid,
the accumulation section having a cooling fluid inlet section for allowing the accumulation section to be replenished with the cooling fluid.

13. The projector according to claim 12, comprising
a cooling fluid replenishment section that accumulates a cooling fluid for replenishment and can be attached/detached to or from the accumulation section,
the replenishment section having a cooling fluid outlet section for allowing the cooling fluid for replenishment to be delivered outside, and replenishing the accumulation section with the cooling fluid for replenishment through the outlet section and the inlet section when having been attached to the accumulation section.

14. The projector according to claim 13, wherein
the inlet section includes a cooling fluid inlet hole through which the accumulation section can be replenished with the cooling fluid, and an inlet valve that closes the inlet hole,
the outlet section includes a cooling fluid outlet hole through which the cooling fluid can be delivered outside the accumulation section, and an outlet valve that closes the outlet hole, and
the accumulation section and the replenishment section have valve guide sections respectively that move the outlet valve and the inlet valve in such a direction to open the inlet hole and the outlet hole in a state where the accumulation section and the replenishment section are attached to each other.

15. The projector according to claim 14, wherein the inlet section includes an inlet valve biasing unit for biasing the inlet valve in such a direction to close the inlet hole.

16. The projector according to claim 14, wherein
the outlet hole has: a sealed chamber in which the outlet valve is firmly attached thereto, the sealed chamber allowing the cooling fluid for replenishment to be encapsulated inside thereof by the outlet valve; and a distribution chamber in which the outlet valve is freely fitted thereto, the distribution chamber allowing the cooling fluid for replenishment to be distributed outside through a gap between the distribution chamber and the outlet valve, and
the valve guide section of the accumulation section moves the outlet valve from the sealed chamber to the distribution chamber in a state where the accumulation section and the replenishment section are attached to each other.

17. The projector according to claim 14, wherein the outlet section includes an outlet valve biasing unit for biasing the outlet valve in such a direction to close the outlet hole.

18. The projector according to claim 12, wherein the inlet section includes the cooling fluid inlet hole for allowing the accumulation section to be replenished with the cooling fluid, and an elastic member that is engaged with the inlet hole to close the same.

19. The projector according to claim 12, wherein the inlet section includes the cooling fluid inlet hole for allowing the accumulation section to be replenished with the cooling fluid, and a screw member that is screwed into the inlet hole to close the same.

20. The projector according to claim 12, wherein the accumulation section includes a fluid volume display section that can display the volume of the inner cooling fluid.

21. The projector according to claim 12, wherein
the accumulation section includes a cooling fluid inflow section that is connected to the plurality of fluid circulation members to allow the cooling fluid to flow in the accumulation section, and a cooling fluid outflow section that is connected to the fluid circulation members to allow the cooling fluid to flow outside the accumulation section, and
each of the inflow section and the outflow section has a tubular shape that can distribute the cooling fluid, and has one end that projects inside of the accumulation section.

22. The projector according to claim 21, wherein the inflow section and the outflow section are formed and arranged in such a manner that the inflow and outflow directions of the cooling fluid cross with each other substantially at right angles in plan view.

23. The projector according to claim 12, wherein
the outer casing has an opening formed corresponding to a position of the accumulation section, and
a cap member is engaged with the opening to close the same.

* * * * *